(12) United States Patent
Hinderliter et al.

(10) Patent No.: US 11,506,126 B2
(45) Date of Patent: Nov. 22, 2022

(54) INTEGRATED FUEL GAS HEATER FOR MOBILE FUEL CONDITIONING EQUIPMENT

(71) Applicant: U.S. Well Services, LLC, Houston, TX (US)

(72) Inventors: Brandon Hinderliter, Houston, TX (US); Jared Oehring, Houston, TX (US)

(73) Assignee: U.S. Well Services, LLC, Houston, TX (US)

( * ) Notice: Subject to any disclaimer, the term of this patent is extended or adjusted under 35 U.S.C. 154(b) by 0 days.

(21) Appl. No.: 16/897,467

(22) Filed: Jun. 10, 2020

(65) Prior Publication Data
US 2020/0386169 A1 Dec. 10, 2020

Related U.S. Application Data

(60) Provisional application No. 62/859,334, filed on Jun. 10, 2019.

(51) Int. Cl.
*F02C 7/224* (2006.01)
*F02C 9/28* (2006.01)
*F02C 9/40* (2006.01)
*F02C 9/46* (2006.01)
*F01D 15/10* (2006.01)
*F02C 7/232* (2006.01)

(52) U.S. Cl.
CPC .............. *F02C 7/224* (2013.01); *F01D 15/10* (2013.01); *F02C 7/232* (2013.01); *F02C 9/28* (2013.01); *F02C 9/40* (2013.01); *F02C 9/46* (2013.01)

(58) Field of Classification Search
CPC .. F02C 9/28; F02C 7/224; F02C 7/232; F02C 9/40; F02C 9/46; F01D 15/10; F05D 2220/64
See application file for complete search history.

(56) References Cited

U.S. PATENT DOCUMENTS

| 1,541,601 | A | 6/1925 | Tribe |
| 1,743,771 | A | 1/1930 | Hall |
| 1,967,466 | A | 7/1934 | Damsel |
| 2,244,106 | A | 6/1941 | Granberg |

(Continued)

FOREIGN PATENT DOCUMENTS

| CA | 3067854 A1 | 1/2019 |
| CN | 104117308 A | 10/2014 |

(Continued)

OTHER PUBLICATIONS

Morris et al., U.S. Appl. No. 62/526,869; Hydration-Blender Transport and Electric Power Distribution for Fracturing Operation; dated Jun. 28, 2018; USPTO; see entire document.

(Continued)

*Primary Examiner* — Todd E Manahan
*Assistant Examiner* — Rene D Ford
(74) *Attorney, Agent, or Firm* — Hogan Lovells Us LLP

(57) ABSTRACT

A system mounted on a skid for use in fracturing operations is disclosed along with an associated method. The system includes a line heater on the skid to enable heating of fuel to be used with a turbine generator and includes one or more pressure regulators coupled to the line heater to enable adjustment of a pressure associated with the fuel.

20 Claims, 5 Drawing Sheets

(56) References Cited

U.S. PATENT DOCUMENTS

| | | |
|---|---|---|
| 2,976,025 A | 3/1961 | Pro |
| 3,347,570 A | 10/1967 | Roessler |
| 3,878,884 A | 4/1975 | Raleigh |
| 3,967,841 A | 7/1976 | Kendrick |
| 4,411,313 A | 10/1983 | Johnson et al. |
| 4,442,665 A | 4/1984 | Fick |
| 4,538,916 A | 9/1985 | Zimmerman |
| 4,601,629 A | 7/1986 | Zimmerman |
| 4,768,884 A | 9/1988 | Elkin |
| 4,783,038 A | 11/1988 | Gilbert |
| 5,114,239 A | 5/1992 | Allen |
| 5,293,947 A | 3/1994 | Stratton |
| 5,334,899 A | 8/1994 | Skybyk |
| 5,395,230 A * | 3/1995 | Ferguson ............ F23C 3/004 431/12 |
| 5,439,066 A | 8/1995 | Gipson |
| 5,486,047 A | 1/1996 | Zimmerman |
| 5,517,822 A | 5/1996 | Haws et al. |
| 5,549,285 A | 8/1996 | Collins |
| 5,606,853 A | 3/1997 | Birch |
| 5,791,636 A | 8/1998 | Loziuk |
| 5,798,596 A | 8/1998 | Lordo |
| 5,813,455 A | 9/1998 | Pratt et al. |
| 5,894,888 A | 4/1999 | Wiemers |
| 5,950,726 A | 9/1999 | Roberts |
| 6,035,265 A | 3/2000 | Dister et al. |
| 6,097,310 A | 8/2000 | Harrell et al. |
| 6,116,040 A | 9/2000 | Stark |
| 6,121,705 A | 9/2000 | Hoong |
| 6,273,193 B1 | 8/2001 | Hermann et al. |
| 6,315,523 B1 | 11/2001 | Mills |
| 6,406,011 B1 | 6/2002 | Kosar |
| 6,442,942 B1 | 9/2002 | Kopko |
| 6,510,695 B1 | 1/2003 | Fisher |
| 6,585,455 B1 | 7/2003 | Petersen et al. |
| 6,626,646 B2 | 9/2003 | Rajewski |
| 6,765,304 B2 | 7/2004 | Baten et al. |
| 6,788,022 B2 | 9/2004 | Sopko |
| 6,837,910 B1 | 1/2005 | Koshikawa |
| 6,985,750 B1 | 1/2006 | Vicknair et al. |
| 7,170,262 B2 | 1/2007 | Pettigrew |
| 7,279,655 B2 | 10/2007 | Blutke |
| 7,309,835 B2 | 12/2007 | Morrison |
| 7,341,287 B2 | 3/2008 | Gibb |
| 7,494,263 B2 | 2/2009 | Dykstra |
| 7,717,193 B2 | 5/2010 | Egilsson |
| 7,770,396 B2 | 8/2010 | Roby |
| 7,795,830 B2 | 9/2010 | Johnson |
| 7,807,048 B2 | 10/2010 | Collette |
| 7,845,413 B2 | 12/2010 | Shampine |
| 7,900,893 B2 | 3/2011 | Teurlay |
| 7,940,039 B2 | 5/2011 | de Buda |
| 8,146,665 B2 | 4/2012 | Neal |
| 8,221,513 B2 | 7/2012 | Ariyapadi |
| 8,272,439 B2 | 9/2012 | Strickland |
| RE44,444 E | 8/2013 | Dole |
| 8,506,267 B2 | 8/2013 | Gambier et al. |
| 8,556,302 B2 | 10/2013 | Dole |
| 8,616,274 B2 | 12/2013 | Belcher |
| 8,763,387 B2 | 7/2014 | Schmidt |
| 8,789,601 B2 | 7/2014 | Broussard |
| 8,795,525 B2 | 8/2014 | McGinnis et al. |
| 8,905,056 B2 | 12/2014 | Kendrick |
| 8,997,904 B2 | 4/2015 | Cryer |
| 9,051,923 B2 | 6/2015 | Kuo |
| 9,062,545 B2 | 6/2015 | Roberts et al. |
| 9,140,105 B2 | 9/2015 | Pattillo |
| 9,353,593 B1 | 5/2016 | Lu et al. |
| 9,410,410 B2 | 8/2016 | Broussard |
| 9,450,385 B2 | 9/2016 | Kristensen |
| 9,482,086 B2 | 11/2016 | Richardson et al. |
| 9,506,333 B2 | 11/2016 | Castillo et al. |
| 9,534,473 B2 | 1/2017 | Morris |
| 9,706,185 B2 | 7/2017 | Ellis |
| 9,739,546 B2 | 8/2017 | Bertilsson et al. |
| 9,745,840 B2 | 8/2017 | Oehring |
| 9,790,858 B2 | 10/2017 | Kanebako |
| 9,840,901 B2 | 12/2017 | Oehring |
| 9,893,500 B2 | 2/2018 | Oehring |
| 9,903,190 B2 | 2/2018 | Conrad |
| 9,945,365 B2 | 4/2018 | Hernandez et al. |
| 9,970,278 B2 | 5/2018 | Broussard |
| 10,020,711 B2 | 7/2018 | Oehring |
| 10,119,381 B2 | 11/2018 | Oehring |
| 10,184,465 B2 | 1/2019 | Enis et al. |
| 10,221,639 B2 | 3/2019 | Romer et al. |
| 10,254,732 B2 | 4/2019 | Oehring |
| 10,280,724 B2 | 5/2019 | Hinderliter |
| 10,302,079 B2 | 5/2019 | Kendrick |
| 10,337,308 B2 | 7/2019 | Broussard |
| 10,408,030 B2 | 9/2019 | Oehring |
| 10,408,031 B2 | 9/2019 | Oehring |
| 10,415,332 B2 | 9/2019 | Morris et al. |
| 10,526,882 B2 | 1/2020 | Oehring |
| 10,627,003 B2 | 4/2020 | Dale et al. |
| 10,648,270 B2 | 5/2020 | Brunty et al. |
| 10,648,311 B2 | 5/2020 | Oehring |
| 10,669,471 B2 | 6/2020 | Schmidt et al. |
| 10,686,301 B2 | 6/2020 | Oehring et al. |
| 10,690,131 B2 | 6/2020 | Rashid |
| 10,695,950 B2 | 6/2020 | Igo et al. |
| 10,711,576 B2 | 7/2020 | Bishop |
| 10,731,561 B2 | 8/2020 | Oehring et al. |
| 10,740,730 B2 | 8/2020 | Altamirano et al. |
| 10,767,561 B2 | 9/2020 | Brady |
| 10,781,752 B2 | 9/2020 | Kikkawa et al. |
| 10,794,165 B2 | 10/2020 | Fischer et al. |
| 10,934,824 B2 | 3/2021 | Oehring |
| 10,988,998 B2 | 4/2021 | Fischer et al. |
| 11,091,992 B2 | 8/2021 | Broussard |
| 2001/0000996 A1 | 5/2001 | Grimland et al. |
| 2003/0079875 A1 | 1/2003 | Weng |
| 2003/0057704 A1 | 3/2003 | Baten |
| 2004/0045703 A1 | 3/2004 | Hooper et al. |
| 2005/0116541 A1 | 6/2005 | Seiver |
| 2005/0201197 A1 | 9/2005 | Duell et al. |
| 2006/0109141 A1 | 5/2006 | Huang |
| 2007/0125544 A1 | 6/2007 | Robinson |
| 2007/0201305 A1 | 8/2007 | Heilman |
| 2008/0095644 A1 | 4/2008 | Mantei et al. |
| 2008/0164023 A1 | 7/2008 | Dykstra et al. |
| 2008/0217024 A1 | 9/2008 | Moore |
| 2008/0236818 A1 | 10/2008 | Dykstra |
| 2008/0257449 A1 | 10/2008 | Weinstein et al. |
| 2008/0277120 A1 | 11/2008 | Hickie |
| 2008/0288115 A1 | 11/2008 | Rusnak |
| 2009/0068031 A1 | 3/2009 | Gambier |
| 2009/0068301 A1 | 3/2009 | Gambier |
| 2009/0072645 A1 | 3/2009 | Quere |
| 2009/0078410 A1 | 3/2009 | Krenek |
| 2009/0114392 A1 | 5/2009 | Tolman |
| 2009/0153354 A1 | 6/2009 | Daussin |
| 2009/0308602 A1 | 12/2009 | Bruins |
| 2009/0315297 A1 | 12/2009 | Nadeau |
| 2010/0038907 A1 | 2/2010 | Hunt |
| 2010/0193057 A1 | 8/2010 | Garner |
| 2010/0250139 A1 | 9/2010 | Hobbs |
| 2010/0281876 A1 | 11/2010 | Khan |
| 2011/0025267 A1* | 2/2011 | Kamen ................ B60L 53/30 320/109 |
| 2011/0052423 A1 | 3/2011 | Gambier et al. |
| 2011/0061855 A1 | 3/2011 | Case |
| 2011/0081268 A1 | 4/2011 | Ochoa et al. |
| 2011/0110793 A1 | 5/2011 | Leugemors et al. |
| 2011/0175397 A1 | 7/2011 | Amrine |
| 2011/0197988 A1 | 8/2011 | Van Vliet |
| 2011/0203291 A1* | 8/2011 | Erickson ............... F23N 1/00 60/776 |
| 2011/0241590 A1 | 10/2011 | Horikoshi |
| 2012/0063936 A1 | 3/2012 | Baxter et al. |
| 2012/0112757 A1 | 5/2012 | Vrankovic |
| 2012/0150455 A1 | 6/2012 | Franklin et al. |
| 2012/0152716 A1 | 6/2012 | Kikukawa et al. |
| 2012/0255734 A1 | 10/2012 | Coli |

(56) References Cited

U.S. PATENT DOCUMENTS

| | | |
|---|---|---|
| 2013/0051971 A1 | 2/2013 | Wyse et al. |
| 2013/0078114 A1 | 3/2013 | Van Rijswick |
| 2013/0111928 A1* | 5/2013 | Bernert, Sr. ............ F17C 13/00 62/50.2 |
| 2013/0138254 A1 | 5/2013 | Seals |
| 2013/0180722 A1 | 7/2013 | Olarte Caro et al. |
| 2013/0189629 A1 | 7/2013 | Chandler |
| 2013/0255271 A1 | 10/2013 | Yu et al. |
| 2013/0284455 A1 | 10/2013 | Kajaria et al. |
| 2013/0299167 A1 | 11/2013 | Fordyce et al. |
| 2013/0306322 A1 | 11/2013 | Sanborn |
| 2014/0077607 A1 | 3/2014 | Clarke |
| 2014/0090387 A1* | 4/2014 | John ....................... F02C 7/224 60/772 |
| 2014/0138079 A1 | 5/2014 | Broussard |
| 2014/0174717 A1 | 6/2014 | Broussard |
| 2014/0294603 A1 | 10/2014 | Best |
| 2015/0114652 A1 | 4/2015 | Lestz |
| 2015/0144336 A1 | 5/2015 | Hardin |
| 2015/0147194 A1 | 5/2015 | Foote |
| 2015/0233530 A1 | 8/2015 | Sandidge |
| 2015/0252661 A1 | 9/2015 | Glass |
| 2016/0006311 A1 | 1/2016 | Li |
| 2016/0230660 A1 | 8/2016 | Zeitoun et al. |
| 2016/0258267 A1 | 9/2016 | Payne |
| 2016/0273456 A1 | 9/2016 | Zhang et al. |
| 2016/0290114 A1 | 10/2016 | Oehring |
| 2016/0326853 A1 | 11/2016 | Fred et al. |
| 2016/0326854 A1 | 11/2016 | Broussard |
| 2016/0348479 A1 | 12/2016 | Oehring |
| 2017/0016433 A1 | 1/2017 | Chong |
| 2017/0043280 A1 | 2/2017 | Vankouwenberg |
| 2017/0074076 A1 | 3/2017 | Joseph et al. |
| 2017/0082033 A1 | 3/2017 | Wu et al. |
| 2017/0096889 A1 | 4/2017 | Blanckaert et al. |
| 2017/0138171 A1 | 5/2017 | Richards et al. |
| 2017/0159654 A1 | 6/2017 | Kendrick |
| 2017/0204852 A1 | 7/2017 | Barnett |
| 2017/0212535 A1 | 7/2017 | Shelman et al. |
| 2017/0226838 A1 | 8/2017 | Ceizobka et al. |
| 2017/0226842 A1 | 8/2017 | Omont |
| 2017/0292784 A1* | 10/2017 | Rowe ....................... C10L 3/12 |
| 2017/0370639 A1 | 12/2017 | Barden et al. |
| 2018/0090914 A1 | 3/2018 | Johnson et al. |
| 2018/0181830 A1 | 6/2018 | Laharuka et al. |
| 2018/0223696 A1* | 8/2018 | Fujita ...................... F02C 7/224 |
| 2018/0259080 A1 | 9/2018 | Dale et al. |
| 2018/0266217 A1 | 9/2018 | Funkhauser et al. |
| 2018/0284817 A1 | 10/2018 | Cook et al. |
| 2018/0298731 A1 | 10/2018 | Bishop |
| 2018/0306119 A1* | 10/2018 | Zhang ..................... F02C 7/224 |
| 2018/0312738 A1 | 11/2018 | Rutsch et al. |
| 2018/0313677 A1 | 11/2018 | Warren et al. |
| 2018/0363640 A1 | 12/2018 | Kajita et al. |
| 2018/0366950 A1 | 12/2018 | Pedersen et al. |
| 2019/0040727 A1 | 2/2019 | Oehring et al. |
| 2019/0112977 A1* | 4/2019 | Kim ....................... F01K 23/10 |
| 2019/0128104 A1 | 5/2019 | Graham et al. |
| 2019/0145251 A1 | 5/2019 | Johnson |
| 2019/0154020 A1 | 5/2019 | Glass |
| 2019/0249527 A1 | 8/2019 | Kraynek |
| 2019/0257462 A1 | 8/2019 | Rogers |
| 2019/0353303 A1* | 11/2019 | Morris .................... F04B 17/03 |
| 2020/0040878 A1 | 2/2020 | Morris |
| 2020/0047141 A1 | 2/2020 | Oehring et al. |
| 2020/0088152 A1 | 3/2020 | Alloin et al. |
| 2020/0325760 A1 | 10/2020 | Markham |
| 2020/0347725 A1* | 11/2020 | Morris ............ F02M 35/02416 |
| 2020/0350790 A1 | 11/2020 | Luft et al. |
| 2021/0094894 A1* | 4/2021 | Whitmore .............. F25J 3/0257 |

FOREIGN PATENT DOCUMENTS

| | | |
|---|---|---|
| CN | 104196613 A | 12/2014 |
| CN | 205986303 U | 2/2017 |
| CN | 108049999 A | 5/2018 |
| CN | 112196508 A | 1/2021 |
| WO | 00/47893 | 8/2000 |
| WO | 2009046280 | 4/2009 |
| WO | 2012/051705 | 4/2012 |
| WO | 2014/116761 | 7/2014 |
| WO | 2014/177346 | 11/2014 |
| WO | 2014177346 | 11/2014 |
| WO | 2018044307 A1 | 3/2018 |
| WO | 2018213925 A1 | 11/2018 |
| WO | 2019210417 | 11/2019 |

OTHER PUBLICATIONS

Final Office Action dated Feb. 4, 2021 in U.S. Appl. No. 16/597,014.
International Search Report and Written Opinion dated Feb. 4, 2021 in PCT/US20/59834.
International Search Report and Written Opinion dated Feb. 2, 2021 in PCT/US20/58906.
International Search Report and Written Opinion dated Feb. 3, 2021 in PCT/US20/58899.
Non-Final Office Action dated Jan. 29, 2021 in U.S. Appl. No. 16/564,185.
Final Office Action dated Jan. 21, 2021 in U.S. Appl. No. 16/458,696.
Final Office Action dated Jan. 11, 2021 in U.S. Appl. No. 16/404,283.
Non-Final Office Action dated Jan. 4, 2021 in U.S. Appl. No. 16/522,043.
International Search Report and Written Opinion dated Dec. 14, 2020 in PCT/US2020/53980.
Non-Final Office dated Oct. 26, 2020 in U.S. Appl. No. 15/356,436.
Non-Final Office dated Oct. 5, 2020 in U.S. Appl. No. 16/443,273.
Non-Final Office Action dated Sep. 29, 2020 in U.S. Appl. No. 16/943,727.
Non-Final Office Action dated Sep. 2, 2020 in U.S. Appl. No. 16/356,263.
Non-Final Office Action dated Aug. 31, 2020 in U.S. Appl. No. 16/167,083.
Albone, "Mobile Compressor Stations for Natural Gas Transmission Service," ASME 67-GT-33, Turbo Expo, Power tor Land, Sea and Air, vol. 79887, p. 1-10, 1967.
Canadian Office Action dated Sep. 22, 2020 in Canadian Application No. 2,982,974.
International Search Report and Written Opinion dated Sep. 3, 2020 in PCT/US2020/36932.
"Process Burner" (https://www.cebasrt.com/productsloii-gaslprocess-bumer) 06 Sep. 6, 2018 (Sep. 6, 2018), entire document, especially para (Burners for refinery Heaters].
"Water and Glycol Heating Systems"(https://www.heat-inc.com/wg-series-water-glycol-systems/) Jun. 18, 2018 (Jun. 18, 2018), entire document, especially WG Series Water Glycol Systems.
"Heat Exchanger" (https://en.wikIpedia.org/w/index.php?title=Heat_exchanger&oldid=89300146) Dec. 18, 2019 Apr. 2019 (Apr. 18, 2019), entire document, especially para (0001].
Canadian Office Action dated Sep. 8, 2020 in Canadian Patent Application No. 2,928,707.
Canadian Office Action dated Aug. 31, 2020 in Canadian Patent Application No. 2,944,980.
Non-Final Office Action issued in U.S. Appl. No. 14/881,535 dated May 20, 2020.
Non-Final Office Action issued in U.S. Appl. No. 15/145,443 dated May 8, 2020.
Non-Final Office Action issued in U.S. Appl. No. 16/458,696 dated May 22, 2020.
Karin, "Duel Fuel Diesel Engines," (2015), Taylor & Francis, pp. 62-63, Retrieved from https://app.knovel.com/hotlink/toc/id:kpDFDE0001/dual-fueal-diesel-engines/duel-fuel-diesel-engines (Year 2015).
Goodwin, "High-voltage auxilliary switchgear for power stations," Power Engineering Journal, 1989, 10 pg. (Year 1989).

(56) References Cited

OTHER PUBLICATIONS

International Search Report and Written Opinion mailed in PCT/US20/67526 dated May 6, 2021.
International Search Report and Written Opinion mailed in PCT/US20/67608 dated Mar. 30, 2021.
International Search Report and Written Opinion mailed in PCT/US20/67528 dated Mar. 19, 2021.
International Search Report and Written Opinion mailed in PCT/US20/67146 dated Mar. 29, 2021.
International Search Report and Written Opinion mailed in PCT/US20/67523 dated Mar. 22, 2021.
International Search Report and Written Opinion mailed in PCT/US2020/066543 dated May 11, 2021.
Kroposki et al., Making Microgrids Work, 6 IEEE Power and Energy Mag. 40, 41 (2008).
Dan T. Ton & Merrill A. Smith, The U.S Department of Energy's Microgrid Initiative, 25 The Electricity J. 84 (2012), pp. 84-94.
Non-Final Office Action issued in U.S. Appl. No. 16/871,328 dated Dec. 9, 2021.
Non-Final Office Action issued in U.S. Appl. No. 16/943,935 dated Oct. 21, 2021.
Non-Final Office Action issued in U.S. Appl. No. 16/564,186, dated Oct. 15, 2021.
Final Office Action issued in U.S. Appl. No. 16/356,263 dated Oct. 7, 2021.
Non-Final Office Action issued in U.S. Appl. No. 17/060,647 dated Sep. 20, 2021.
Non-Final Office Action issued in U.S. Appl. No. 16/901,774 dated Sep. 14, 2021.
Canadian Office Action issued in Canadian Application No. 3,094,768 dated Oct. 28, 2021.
Non-Final Office Action issued in U.S. Appl. No. 16/871,928 dated Aug. 25, 2021.
Non-Final Office Action issued in U.S. Appl. No. 16/943,727 dated Aug. 3, 2021.
Non-Final Office Action issued in U.S. Appl. No. 14/881,525 dated Jul. 21, 2021.
Non-Final Office Action issued in U.S. Appl. No. 16/404,283 dated Jul. 21, 2021.
Notice of Allowance and Notice of Allowability issued in U.S. Appl. No. 15/829,419 dated Jul. 26, 2021.
Woodbury et al., "Electrical Design Considerations for Drilling Rigs," IEEE Transactions on Industry Applications, vol. 1A-12, No. 4, Jul./Aug. 1976, pp. 421-431.
*U.S. Well Services, LLC* v *Tops Well Services, LLC and Honghua America, LLC*, Case No. 3:19-cv-00237, Document 72-9, Declaration of Dr. Robert Schaaf, Apr. 24, 2020, 52 pages.
*U.S. Well Services, LLC* v *Tops Well Services, LLC and Honghua America, LLC*, Case No. 3:19-cv-00237 Document 72-9, Declaration of Dr. Robert Schaaf—part 2, Apr. 24, 2020, 128 pages.
*U.S. Well Services, LLC* v *Tops Well Services, LLC and Honghua America, LLC*, Case No. 3:19-cv-00237, Document 72-9, Declaration of Dr. Robert Schaaf—part 3, Apr. 24, 2020, 47 pages.
*U.S. Well Services, LLC* v *Tops Well Services, LLC and Honghua America, LLC*, Case No. 3:19-cv-00237, Document 72, Plaintiffs Opening Claim Construction Brief, Apr. 24, 2020, 37 pages.
*U.S. Well Services, LLC* v *Tops Well Services, LLC and Honghua America, LLC*, Case No. 3:19-cv-00237, Document 116, Hearing on Markman and Summary Judgment via Video Conference before the Honorable Andrew M. Edison Day 1 of 1 Day—Transcript, Jun. 15, 2020, 308 pages.
*Kirsch Research and Development, LLC* v *Tarco Specialty Products, Inc.*, Case No. 6:20-cv-00318-ADA, Document 62, Memorandum Opinion and Order Granting Defendant's Opposed Motion to Stay Pending Inter Partes Review of the '482 Patent [ECF No. 57], Oct. 4, 2021, 6 pages.
*Ledcomm LLC* v *Signfiy North America Corp., Signify Holding B.V., and Signify N.V.*, Case No. 6:20-cv-01056-ADA, Document 24, Scheduling Order, Aug. 13, 2021, 4 pages.
*Transcend Shipping Systems, LLC and Hapag-Lloyd AG and Hapag-Lloyd (America) LLC, CMA CGM (America) LLC and CMA CGM S.A., Mediterranean Shipping Company S.A.*, Case Nos. 6:20-cv-1195-ADA, 6:21-cv-0018-ADA, and 6:21-cv-0040-ADA, Document 19, Proposed Amended Scheduling Order, Aug. 13, 2021, 6 pages.
*U.S. Well Services, Inc. and U.S. Well Services, LLC* v *Halliburton Company and Cimarex Energy Co.*, Case No. 6:21-cv-00367-ADA, Document 51, Agreed Scheduling Order, Sep. 16, 2021, 5 pages.
*U.S. Well Services, Inc. and U.S. Well Services, LLC* v *Halliburton Company and Cimarex Energy Co.*, Case No. 6:21-cv-00367-ADA, Plaintiffs Disclosure of Asserted Claims and Preliminary Infringement Contentions, Jul. 12, 2021, 9 pages.
*U.S. Well Services, Inc. and U.S. Well Services, LLC* v *Halliburton Company and Cimarex Energy Co.*, Case No. 6:21-cv-00367-ADA, Plaintiff U.S. Well Services, LLC's Disclosure of Extrinsic Evidence, Oct. 19, 2021, 10 pages.
*U.S. Well Services, Inc. and U.S. Well Services, LLC* v *Halliburton Company and Cimarex Energy Co.*, Case No. 6:21-cv-00367-ADA, Defendants' Preliminary Invalidity Contentions, Sep. 10, 2021, 193 pages.
*U.S. Well Services, Inc. and U.S. Well Services, LLC* v *Halliburton Company and Cimarex Energy Co.*, Case No. 6:21-cv-00367-ADA, Document 1-8, Exhibit H, Halliburton—All Electric Fracturing Reducing Emissions and Cost, Apr. 15, 2021, 6 pages.
Bill Lockley and Barry Wood, "What do the API Motor/Generator Features Cost and What Do They Buy You?" 2010 IEEE, Paper No. PCIC-2010-22, 10 pages.
American Petroleum Institute, "Form-wound Squirrel-Cage Induction Motors—500 Horsepower and Larger," Jun. 2004, Fourth Edition, ANSI/API Standard 541-2003, 88 pages.
Assignment record of U.S. Pat. No. 9,366,114, accessed Aug. 19, 2021, 2 pages.
ASTM International, "Standard Specification for Steel Bars, Carbon and Alloy, Hot-Wrought, General Requirements" Oct. 13, 2006, 16 pages.
"U.S. Well Services Issues $125.5 Million Convertible Senior Secured PIK Notes, Executes License Agreement with ProFrac Manufacturing, LLC and Finalizes Amendment to Senior Secured Term Loan," Jun. 28, 2021, https://finance.yahoo.com/news/u-well-services-issues-125-203000637.html?guccounter=1, 6 pages.
Declaration of Joel N. Broussard, Case Nos. IPR2021-01032 & IPR2021-01033, Oct. 13, 2021, 9 pages.
Declaration of Dr. Robert Durham, Case Nos. IPR2021-01033, IPR2021-01032 and IPR2021-01034, Jun. 18, 2021, 179 pages.
Declaration of Robert Schaaf, Case Nos. IPR2021-01032 and IPR2021-01033, Oct. 12, 2021, 45 pages.
Declaration of Sylvia D. Hall-Ellis, Ph D., Case Nos. IPR2021-01032, IPR2021-01033, and IPR2021-01034, Jun. 18, 2021, 173 pages.
Stephen Cary et al., "Electric Rotating Machine Standards Part II: Magnetic Wedge Design & Monitoring Methods," 2011 IEEE, Paper No. PCIC-2011-41, 8 pages.
Janice Hoppe-Spiers, "Deploying Change," Energy & Mining International, Spring 2017, http://www.emi-magazine.com, 5 pages.
Jim Harris, "U.S. Well Services LLC—Energy and Mining Magazine," Energy & Mining International, Oct. 12, 2021, https://www.emi-magazine.com/sections/profiles/1221-US-well-services-llc, 3 pages.
"Clean Fleet Reduces Emissions by 99% at Hydraulic Fracturing Sites," Fluid Power Journal, https://fluidpowerjournal.com/clean-fleet-reduces-emissions/, accessed Sep. 22, 2021, 5 pages.
Gardner Denver, Well Servicing Pump Model GD-2500Q Quintuplex—Operating and Service Manual, Aug. 2005, 46 pages.
"Halliburton Delivers Successful Grid-Powered Frac Operation," https://www.halliburton.com/en/about-us/press-release/halliburton-delivers-first-successful-grid-powered-fracturing-operation, accessed Sep. 27, 2021, 4 pages.
Hart Energy, Hydraulic Fracturing Techbook, 2015, 99 pages.
R. Mistry et al., "Induction Motor Vibrations in view of the API 541—4th Edition," IEEE, accessed Jun. 10, 2021, 10 pages.
"Game-changing hydraulic fracturing technology, reduces emissions by 99%," Intrado Globe News Wire, Oct. 1, 2014, https://www.globenewswire.com/fr/news-release/2014/10/01/670029/

(56) References Cited

OTHER PUBLICATIONS

10100696/en/Game-changing-hydraulic-fracturing-technology-reduces-emissions-by-99.html, 4 pages.
Ml. Hodowanec et al., "Introduction to API Standard 541, 4th Edition—Form-Wound Squirrel Cage Induction Motors—Larger than 500 Horsepower," 2003, IEEE, Paper No. PCIC-2003-33, 9 pages.
D. Bogh et al., "A User's Guide to Factory Testing of Large Motors: What Should Your Witness Expect," IEEE, accessed Jun. 10, 2021, 8 pages.
Dani Kass, "Fintiv Fails: PTAB Uses 'Remarkably Inaccurate' Trial Dates," Nov. 2, 2021, Law 360, 1 page.
Eugene A. Avallone et al., "Marks' Standard Handbook for Mechanical Engineers, 11th Edition," 2007, pp. 3-65, 14-2, 14-3, 14-13, 14-14, 20-91, 22-12, 22-13, 22-14, 22-15, 22-16, 10-3, 20-21, 20-22, 20-85, 20-86, 20-89, and 20-90.
T. W. Pascall et al., "Navigating the Test Requirements of API 541 4th Edition," 2007, IEEE, Paper No. PCIC-2007-11, 12 pages.
"Kerr Pumps & FlowVale Awards for Excellence in Well Completion, Northeast 2017—Awarded to: U.S. Well Services," https://www.oilandgasawards.com/winner/northeast-2017-kerr-pumps-flowvale-awards . . . , accessed Oct. 5, 2021, 4 pages.
"New Technology Development Award—General/Products, Northeast 2015—Awarded to: U.S. Well Services, LLC," https://www.oilandgasawards.com/winner/northeast-2015-new-technology-development-award-generalproducts/#, accessed Aug. 23, 2021, 4 pages.
*U.S. Well Services, Inc.* v. *Halliburton Company*, Civil Docket for Case # 6:21-cv-00367-ADA, https://ecf.txwd.uscourts.gov/cgi-bin/DktRpt.pl?190912742001885-L_1_0-1, Accessed Nov. 29, 2021, 13 pages.
A. T. Dufresne, "How reliable are trial dates relied on by the PTAB in the Fintiv analysis?" Perkins Coie, 2021, 3 pages.
J. Malinowski et al., "Petrochemical Standards A Comparison Between IEEE 841-2001, API 541, and API 547," 2004, IEEE, Paper No. PCIC-2004-22, 8 pages.
"Petroleum Alumnus and Team Develop Mobile Fracturing Unit that Alleviates Environmental Impact," 2015, LSU, https://www.lsu.edu/eng/news/2015/07/20150713-mobile-fracturing-unit.php, accessed Sep. 22, 2021, 2 pages.
Liz Hampton, "Low-cost fracking offers boon to oil producers, headaches for suppliers," Reuters, Sep. 12, 2019, https://www.reuters.com/article/us-usa-oil-electric-fracturing-focus/low-cost-fracking-offers-boon-to-oil-producers-headaches-for-supplies, 11 pages.
Liz Hampton, "U.S. Well Services files e-frac patent lawsuit against Halliburton, Cimarex Energy," Reuters, Apr. 15, 2021, https://www.reuters.com/business/energy/us-well-services-files-e-frac-patent-lawsuit-against-halliburton-cimarex-energy, 10 pages.
Collins English Dictionary, Twelfth Edition, 2014, p. 1005.
Declaration of Robert Schaaf, IPR2021-01539, Jan. 25, 2022, 37 pages.
Department of Transportation, Federal Motor Carrier Safety Administration, 49 CFR Parts 390, 392 and 393—Parts and Accessories Necessary for Safe Operation; General Amendments; Final Rule, Federal Register, Aug. 15, 2005, vol. 70, No. 156, 49 pages.
D. Nedelcut et al., "On-line and Off-line Monitoring-Diagnosis System (MDS) for Power Transformers," IEEE, 2008 International Conference on Condition Monitoring and Diagnosis, Beijing, China, Apr. 21-24, 2008, 7 pages.
Random House Webster's Unabridged Dictionary, Second Edition, 2001, p. 990.
A. B. Lobo Ribeiro et al., "Multipoint Fiber-Optic Hot-Spot Sensing Network Integrated Into High Power Transformer for Continuous Monitoring," IEEE Sensors Journal, Jul. 2008, vol. 8, No. 7, pp. 1264-1267.
Society of Automotive Engineers, SAE J1292: Automobile, Truck, Truck-Tractor, Trailer, and Motor Coach Wiring, 49 CFR 393.28, Oct. 1981, 6 pages.
"StarTech NETRS2321E 1 Port RS-232/422/485 Serial over IP Ethernet Device Server," StarTech, http://www.amazon.com/StarTech-NETRS2321E-RS-232-Serial-Ethernet/dp/B000YN0N0S, May 31, 2014, 4 pages.
"StarTech.com 1 Port RS232 Serial to IP Ethernet Converter (NETRS2321P)," StarTech, http://www.amazon.com/StarTech-com-Serial-Ethernet-Converter-NETRS232IP/dp/B00FJEHNSO, Oct. 9, 2014, 4 pages.
"TCP/IP Ethernet to Serial RS232 RS485 RS422 Converter," Atc, http://www.amazon.com/Ethernet-Serial-RS232-RS485-Converter/dp/B00ATV2DX2, Feb. 1, 2014, 2 pages.
"SainSmart TCP/IP Ethernet to Serial RS232 RS485 Intelligent Communication Converter," SainSmart, http://www.amazon.com/SainSmart-Ethernet-Intelligent-Communication-Converter/dp/B008BGLUHW, Aug. 17, 2014, 4 pages.
"Global Cache iTach, IP to Serial with PoE (IP2SL-P)," Global Cache, https://www.amazon.com/Global-Cache-iTach-Serial-IP2SL-P/dp/B003BFVNS4/, Oct. 30, 2014, 3 pages.
Declaration of Robert Durham, IPR2022-00074, Nov. 8, 2021, 177 pages.
Declaration of Robert Schaaf, IPR2022-00074, Feb. 17, 2022, 36 pages.
Eugene A. Avallone, Marks' Standard Handbook for Mechanical Engineers: 11th Edition, 2007, p. 16-4 and 16-22.
Moxa 802.11 Ethernet to Serial, Moxastore, http://www.moxastore.com/Moxa_802_11_Wi_Fi_Ethernet_to_Serial_s/587.html, May 24, 2016, 1 page.
Project Registration, Moxastore, http://www.moxastore.com, Feb. 15, 2015, 2 pages.
About US, Moxastore, http://www.moxastore.com/aboutus.asp, Mar. 8, 2015, 1 page.
Declaration of Duncan Hall, Internet Archive, Oct. 26, 2021, https://web.archive.org/web/20140531134153/http://www.amazon.com/StarTech-NETRS2321E-RS-232-Serial-Ethernet/dp/B000YB0NOS, 43 pages.
Michael Quentin Morton, Unlocking the Earth: A Short History of Hydraulic Fracturing (2013), GeoExpro, vol. 10, No. 6, 5 pages.
Accommodating Seismic Movement, Victaulic Company, 2015, https://web.archive.org/web/20150412042941/http://www.victaulic.com:80/en/businesses-solutions/solutions/accommoda . . . , 2 pages.
Style W77 AGS Flexible Coupling, Victaulic Company 2015, https://web.archive.org/web/20150423052817/http://www.victaulic.com:80/en/products-services/products/style-w77-ags-f . . . , 1 page.
AGS Large Diameter Solutions, Victaulic Company, 2015, https://web.archive.org/web/20150419063052/http://www.victaulic.com:80/en/businesses-solutions/solutions/advanced-gr . . . , 2 pages.
Chiksan Original Swivel Joints, FMC, 1997, 16 pages.
CoorsTek Flowguard Products, 2012, 8 pages.
Declaration of Sylvia D. Hall-Ellis, IPR2022-00610, Feb. 28, 2022, 98 pages.
Gardner Denver, Well Servicing Pump Model GD-2500Q, GD-2500Q-HD, Quintuplex Pumps, Sep. 2011, 45 pages.
Eugene A. Avallone, Marks' Standard Handbook for Mechanical Engineers: 11th Edition, 2007, Section 14, 18 pages.
Mohinder L. Nayyar, Piping Handbook Seventh Edition, McGraw-Hill Handbook, 2000, 77 pages.
Pulsation Dampers, Coorstek, 2014, https://web.archive.org/web/20140919005733/http://coorstek.com/markets/energy_equip . . . , 2 pages.
M. E. Rahman et al., "Wire rope isolators for vibration isolation of equipment and structures—A review," IOP Conference Series Materials Science and Engineering, Apr. 2015, 12 pages.
Victaulic Couplings Vibration Attenuation Characteristics, Victaulic, Publication 26.04, Oct. 2014, 5 pages.
Thorndike Saville, The Victaulic Pipe Joint, Journal of American Water Works Association, Nov. 1922, vol. 9, No. 6, pp. 921-927.
J. C. Wachel et al., "Analysis of Vibration and Failure Problems in Reciprocating Triplex Pumps for Oil Pipelines," The American Society of Mechanical Engineers, Presented at the Energy-Sources and Technology Conference and Exhibition, Dallas, Texas, Feb. 17-21, 1985, 8 pages.

(56) References Cited

OTHER PUBLICATIONS

Declaration of Nathaniel E. Frank-White, Internet Archive, Feb. 17, 2022, http://web.archive.org/web/20140329090440/http://www.enidline.com/pdffiles/WR_Catalog_2012.pdf, 82 pages.
Wire Rope Isolator Technologies, Enidine, Dec. 2011, 78 pages.
World's Best Swivel Joints, Flowvalve, 2013, https://web.archive.org/web/20150117041757/http://www.flowvalve.com:80/swivels, 10 pages.
U.S. Well Services, Inc. files suit against Halliburton Company and Cimarex Energy Co. for patent infringement, Apr. 15, 2021, PR Newswire, https://www.prnewswire.com/news-releases/us-well-services-inc-files-suit-against-halliburton-company-and-cimarex-energy-co-for-patent-infringement-301270118.html, 2 pages.
Services—U.S. Well Services, http://uswellservices.com/services/, accessed Nov. 13, 2021, 10 pages.
OSHA Publications, U.S. Department of Labor—Occupational Safety and Health Administration, https://web.archive.org/web/20150406054914/https://www.osha.gov/pls/publications/publication.AthruZ?pType=Industry, Jun. 13, 2021, 3 pages.
Steven C. Carlson, Weaponizing IPRs, Landslide, Sep. 22, 2019, 10 pages.
Declaration of Dr. Mark Ehsani, IPR2021-01066, Jul. 2, 2021, 213 pages.
Declaration of Robert Schaaf, IPR2021-01066, Nov. 17, 2021, 43 pages.
Amazon.com purchase page for Electrical Engineering Reference Manual for the Electrical and Computer PE Exam, Sixth Edition, https://web.archive.org/web/20070103124447/https:/www.amazon.com/Electrical-Engineering-Reference-Manual-Computer/dp/1888577568/, accessed Jul. 23, 2021, 7 pages.
Public Catalog of the U.S. Copyright Office for search result: electrical engineering reference manual, https://cocatalog.loc.gov/cgi-bin/Pwebrecon.cgi?v1=6&ti=1, 6&Search_Arg=electrical engineering reference manual&Search_Code=TALL&CNT=25&PI . . . , accessed Jul. 21, 2021, 2 pages.
Declaration of Robert Schaaf, IPR2021-01238, Nov. 17, 2021, 38 pages.
John A. Camera, PE, Electrical Engineering Reference Manual for the Electrical and Computer PE Exam, Sixth Edition, 2002, 102 pages.
IEEE 100 The Authoritative Dictionary of IEEE Standards Terms Seventh Edition, 2000, 7 pages.
National Electrical Manufacturers Association, NEMA ICS 61800-4 Adjustable Speed Electrical Power Drive Systems, Part 4: General Requirements—Rating Specifications for A.C. Power Drive Systems above 1000 V a.c. and Not Exceeding 35 kV, 2004 22 pages.
Professional Publications, Inc., FE Exam, PE Exam, ARE Exam, and NCIDQ Exam Review / Professional Engineering Licensing, About PPI, https://web.archive.org/web/20031219231426/http://ppi2pass.com:80/catalog/servlet/MyPpi_pg_aboutppi.html, accessed Jul. 22, 2021, 1 page.
Professional Publications, Inc., FE Exam, PE Exam, ARE Exam, and NCIDQ Exam Review / Professional Engineering Licensing, What PPI Customers Say, https://web.archive.org/web/20031226130924/http://ppi2pass.com:80/catalog/servlet/MyPpi_pg_comments-EEcomments.html, accessed Jul. 22, 2021, 2 pages.
Professional Publications, Inc., FE Exam, PE Exam, ARE Exam, and NCIDQ Exam Review / Professional Engineering Licensing, Homepage, https://web.archive.org/web/20040209054901/http://ppi2pass.com:80/catalog/servlet/MyPpi, accessed Jul. 19, 2021, 1 page.
Professional Publications, Inc., FE Exam, PE Exam, ARE Exam, and NCIDQ Exam Review / Professional Engineering Licensing, The PPI Online Catalog, https://web.archive.org/web/20040215142016/http://ppi2pass.com:80/catalog/servlet/MyPpi_ct_MAIN, accessed Jul. 19, 2021, 2 pages.
Professional Publications, Inc., FE Exam, PE Exam, ARE Exam, and NCIDQ Exam Review / Professional Engineering Licensing, Electrical PE Exam Review Products, https://web.archive.org/web/20040214233851/http://ppi2pass.com:80/catalog/servlet/MyPpi_ct_ELECTRICAL, accessed Jul. 19, 2021, 7 pages.
Professional Publications, Inc., FE Exam, PE Exam, ARE Exam, and NCIDQ Exam Review / Professional Engineering Licensing, Instructor's Corner, https://web.archive.org/web/20031219232547/http://ppi2pass.com:80/catalog/servlet/MyPpi_pg_corner-corner.html, accessed Jul. 19, 2021, 2 pages.
Professional Publications, Inc., FE Exam, PE Exam, ARE Exam, and NCIDQ Exam Review / Professional Engineering Licensing, Teaching an Electrical and Computer Engineering PE Exam Review Course, https://web.archive.org/web/20031223100101/http://ppi2pass.com:80/catalog/servlet/MyPpi_pg_corner-teachee.html, accessed Jul. 19, 2021, 2 pages.
Professional Publications, Inc., Books for the FE, PE, FLS and PLS Exams, Spring 2004, http://www.ppi2pass.com/corner/catalog.pdf, 16 pages.
Lionel B. Roe, Practices and Procedures of Industrial Electrical Design, 1972, McGraw-Hill, Inc., Chapter 2: The Basic Electric System, 11 pages.
Declaration of Duncan Hall, Jul. 23, 2021, https://web.archive.org/web/20031219231426/http://ppi2pass.com:80/catalog/servlet/MyPpi_pg_aboutppi.html, 12 pages.
Declaration of Robert Durham, IPR2021-01315, Aug. 12, 2021, 209 pages.
Declaration of Robert Schaaf, IPR2021-01315, Nov. 19, 2021, 39 pages.
*U.S. Well Services, Inc. and U.S. Well Services, LLC v Halliburton Company and Cimarex Energy Co.*, Case No. 6:21-cv-00367-ADA, Document 63, Defendants' Claim Construction Brief in Reply to U.S. Well Services, LLC's Responsive Brief, Dec. 2, 2021, 30 pages.
*U.S. Well Services, Inc. v Halliburton Company*, Case No. 6:21-cv-00367-ADA, Civil Docket, accessed Dec. 17, 2021, 14 pages.
*U.S. Well Services, Inc. v Halliburton Company*, Case No. 6:21-cv-00367-ADA, Document 64, Order Resetting Markman Hearing, Dec. 8, 2021, 1 page.
Approved American National Standard, ANSI/NEMA NG Jan. 2011, American National Standard Motors and Generators, Dec. 9, 2021, 636 pages.
Comprehensive Power: Power it Up, Feb. 27, 2013, 28 pages.
Declaration of Robert Schaaf, IPR2021-01316, Nov. 19, 2021, 33 pages.
Declaration of Robert Durham, IPR2021-01316, Aug. 13, 2021, 75 pages.
Declaration of Robert Schaaf, IPR2021-01538, Dec. 28, 2021, 40 pages.
Declaration of Dr. L. Brun Hilbert, Jr., P.E., IPR2021-01538, Sep. 22, 2021, 99 pages.
Maxwell James Clerk 1868, On Governors, Proc. R. Soc. Lond., pp. 16270-283.
Katsuhiko Ogata, Modern Control Engineering: Third Edition, 1997, 2 pages.
49 C.F.R. Part 393 (Oct. 1, 2006), 36 pages.
Gardner Denver, 3" 1502 Male Hammer Union Discharge Flange, 2005, 13 pages.
Donald G. Fink, "Standard Handbook for Electrical Engineers—Thirteenth Edition," 1993, McGraw-Hill Inc., pp. 10-13, 20-21, 20-22, 20-85, 20-20, 20-89, 20-90, 20-91, 22-12, 22-13, 22-14, 22-15 and 22-16.
Email from Michael See on Jun. 10, 2021 regarding API-541 Fourth Edition: Public Availability, 2 pages.
Halliburton, Halliburtion All-Electric Fracturing Reducing Emissions and Cost Brochure, 2021, 6 pages.
IEEE Power Engineering Society, 112 IEEE Standard Test Procedure for Polyphase Induction Motors and Generators, 2004, 87 pages.
*U.S. Well Services, LLC v Tops Well Services, LLC*, Case No. 3:19-cv-237, Document 135, Order, Sep. 22, 2021, 2 pages.
*U.S. Well Services, Inc. and U.S. Well Services, LLC v Halliburton Company and Cimarex Energy Co.*, Case No. 6:21-cv-00367-ADA, Document 56, Defendants' Opening Claim Construction Brief, Oct. 27, 2021, 46 pages.

(56) References Cited

OTHER PUBLICATIONS

John Daniel, "8.30 DEP Industry Observations: New Flac Fleet; New Fleet Designs Forthcoming," Daniel Energy Partners, Aug. 30, 2020, 13 pages.
Declaration of Joel N. Broussard, IPR2021-01034, IPR2021-01035, IPR2021-01036, and IPR2021-01037, Oct. 20, 2021, 11 pages.
Declaration of Robert Schaaf, IPR2021-01034, Oct. 20, 2021, 47 pages.
Declaration of Dr. Mark Ehsani, IPR2021-01035, Jun. 18, 2021, 188 pages.
Stan Gibilisco, The Illustrated Dictionary of Electronics: Audio/Video Consumer Electronics Wireless Technology—Eighth Edition, 2001, p. 667.
Declaration of Robert Schaaf, IPR2021-01035, Oct. 20, 2021, 51 pages.
Declaration of Dr. L. Brun Hilbert, P.E., IPR2021-01037 and IPR2021-01038, Jun. 21, 2021, 124 pages.
Declaration of Robert Schaaf, IPR2021-01037, Oct. 20, 2021, 52 pages.
Zeus Electric Pumping Unit, Halliburton, http://www.halliburton.com/en/products/zeus-electric-pumping-unit, 2021, 4 pages.
Declaration of Joel N. Broussard, IPR2021-01038, Oct. 20, 2021, 11 pages.
*LedComm LLC* v *Signify North America Corporation*, Case No. 6:20-cv-01056-ADA, Civil Docket, accessed Dec. 8, 2021, 11 pages.
*U.S. Well Services, Inc.* v *Halliburton Company*, Case No. 6:21-cv-00367-ADA, Civil Docket, accessed Dec. 13, 2021, 14 pages.
Declaration of Robert Schaaf, IPR2021-01038, Nov. 10, 2021, 40 pages.
*Transcend Shipping Systems LLC* v *Mediterranean Shipping Company S.A.*, Case No. 6:21-cv-00040, Document 27, Order of Dismissal with Prejudice, Dec. 7, 2021, 1 page.
Centers for Disease Control and Prevention, NIOSH Numbered Publications, https://web.archive.org/web/20120721180008/http://www.cdc.org/niosh/pubs/all_date_desc_nopubnumbers.html, 2012, 57 pages.
America Invents Act, H.R. Rep. No. 112-98, Jun. 1, 2011, 165 pages.
Declaration of Joel N. Broussard, IPR2021-01065, Oct. 20, 2021, 11 pages.
Declaration of Dr. Robert Durham, IPR2021-01065, Jun. 18, 2021, 138 pages.
Declaration of Robert Schaaf, IPR2021-01065, Nov. 10, 2021, 33 pages.
File Wrapper of U.S. Pat. No. 9,410,410, Excerpt—Response to Non-Final Office Action dated Feb. 3, 2016, 57 pages.
Industrial Safety & Hygiene News, OSHA issues hazard alert for fracking and drilling, Jan. 6, 2015, 1 page.
Portfolio Media Inc., A Shift to Sand: Spotlight on Silica Use in Fracking, Law360, https://www.law360.com/articles/366057/print?section=energy, accessed Jun. 10, 2021, 5 pages.
Henry Chajet, "OSHA Issues Alert on Non-Silica Fracking Hazards," Jan. 30, 2015, National Law Review Newsroom, 2 pages.
*U.S. Well Services, LLC*, v *Voltagrid LLC, Nathan Ough, Certarus (USA) Ltd., and Jared Oehring*, Case No. 4:21-cv-3441-LHR, Document 13, Plaintiff U.S. Well Services, LLC's Motion for Preliminary Injunction and Request for Hearing, Nov. 4, 2021, 311 pages.
U.S. Department of Labor—Occupational Safety and Health Administration, Hazard Alert—Worker Exposure to Silica during Hydraulic Fracturing, 2012, 7 pages.
U.S. Department of Labor—Occupational Safety and Health Administration, OSHA and NIOSH issued hazard alert on ensuring workers in hydraulic fracturing operations have appropriate protections from silica exposure, Jun. 21, 2012, 4 pages.
Occupational Safety and Health Administration—Home, United States Department of Labor, https://web.archive.org/web/20120722160756/http://www.osha.gov/, accessed Jun. 13, 2021, 2 pages.
Industry/Hazard Alerts, United States Department of Labor, https://web.archive.org/web/20120801064838/http://www.osha.gov:80/hazardindex.html, accessed Jun. 13, 2021, 1 page.
Hazard Alert—Worker Exposure to Silica during Hydraulic Fracturing, United States Department of Labor, https://web.archive.org/web/20120808200919/http://www.osha.gov/dts/hazardalerts/hydraulic_frac_hazard_alert.html, accessed Jun. 13, 2021, 5 pages.
A. Abbott, Crippling the Innovation Economy: Regulatory Overreach at the Patent Office, Regulatory Transparency Project, Aug. 14, 2017, 35 pages.
D. Heidel, Safety and Health Management Aspects for Handling Silica-based Products and Engineered Nanoparticles in Sequences of Shale Reservoir Stimulations Operations, Society of Petroleum Engineers, 2004, 4 pages.
Testimony of Judge Paul R. Michel (Ret.) United States Court of Appeals for the Federal Circuit Before the Subcommittee on Intellectual Property, U.S Senate Committee on the Judiciary, Jun. 4, 2019, 8 pages.
Bernard D. Goldstein, The Role of Toxicological Science in Meeting the Challenges and Opportunities of Hydraulic Fracturing, 2014, Toxicological Sciences, vol. 139, No. 2, pp. 271-283.
Mike Soraghan, OSHA issues hazard alert for fracking and drilling, E&E, Dec. 10, 2014, 1 page.
"VZ Environmental Award of Excellence in Environmental Stewardship, Rocky Mountain 2016—Awarded to: U.S. Well Services, LLC," Oil & Gas Awards, 2016, https://www.oilandgasawards.com/winner/rocky-mountain-2016-vz-environmental-award-for-excellence-in-environmental-stewardship, accessed Aug. 23, 2021, 4 pages.
Austin H. Bonnett, "Root Cause Failure Analysis for AC Induction Motors in the Petroleum and Chemical Industry," 2010, IEEE, Paper No. PCIC-2010-43, 13 pages.
Carolyn Davis, "Natural Gas Finding Niche in E-Fracking, But Diesel Still Rules," Sep. 6, 2019, Natural Gas Intel, https://www.naturalgasintel.com/natural-gas-finding-niche-in-e-fracking-but-diesel-still-rules, 9 pages.
Tim Rahill and Michael C. Fousha, "Sorting Out the Overlap," Jan./Feb. 2009, IEEE Industry Applications Magazine, 12 pages.
Jodi Shafto, "Growth in electric-fracking fleets stunted by tight producer budgets," Aug. 6, 2019, S&P Global Market Intelligence, https://wwww.spglobal.com/marketintelligence/en/news-insights/latest-news-headlines/growth-in-electric-fracking-fleets-stunted-by-tight-producer-budgets, accessed Sep. 16, 2021, 4 pages.
A. H. Bonnett et al., "Squirrel Cage Rotor Options for A.C. Induction Motors," IEEE, accessed May 18, 2021, 4 pages.
U.S. Well Services Investor and Analyst Update: Second Quarter 2021 in Review, 2021, 7 pages.
Standing Order Governing Proceedings—Patent Cases, in the United States District Court for the Western District of Texas, Waco Division, filed Nov. 17, 2021, 11 pages.
U.S. Well Services—Services, http://uswellservices.com/services/, accessed Nov. 13, 2021, 10 pages.
Elsevier, "Variable Speed Pumping—A Guide to Successful Applications," 2019, 186 pages.
*U.S. Well Services, Inc., and U.S. Well Services, LLC* v *Halliburton Company, Cimarex Energy Co., Halliburton Energy Services, Inc., and Halliburton US Techologies, Inc.*, Case No. WA:21-CV-00367-ADA, Document 61, Order Setting Markman Hearing, Nov. 29, 2021, 1 page.
*U.S. Well Services, Inc., and U.S. Well Services, LLC* v *Halliburton Company, Cimarex Energy Co., Halliburton Energy Services, Inc., and Halliburton US Techologies, Inc.*, Case No. WA:21-CV-00367-ADA, Document 61, Order Resetting Markman Hearing, Dec. 8, 2021, 1 page.
Affidavit of Duncan Hall, Internet Archives on Jun. 7, 2021, https://web.archive.org/web/20120917102614/http:/www.quincieoilfield.com/pdf/3.0%20Gardner%20Denver/2500/GD2500Q%200p%20&%20Service%20Manual.pdf, 76 pages.

* cited by examiner

INTEGRATED FUEL GAS HEATER FOR MOBILE FUEL CONDITIONING EQUIPMENT

CROSS REFERENCE TO RELATED APPLICATION(S)

This application is related to and claims the benefit of priority from U.S. Provisional Application 62/859,334, filed Jun. 10, 2019, titled INTEGRATED FUEL GAS HEATER FOR MOBILE FUEL CONDITIONING EQUIPMENT, the entire disclosure of which is incorporated by reference herein for all intents and purposes.

FIELD

At least one embodiment pertains to improvements in fracturing operations. In at least one embodiment, the present disclosure describes integrated fuel gas heaters for mobile fuel conditioning equipment.

BACKGROUND

Hydraulic Fracturing is a technique used to stimulate production from some hydrocarbon producing wells. The technique may involve injecting fluid using fluid pumps into a wellbore at a pressure sufficient to generate fissures in formation surrounding the wellbore. The fluid pumps that inject pressurized fluid into the wellbore are high pressure pumps referred to as fracturing pumps. The fracturing pumps are powered by diesel engines, but may alternatively be powered by other sources, such as by electric motors. Electric hydraulic fracturing operations use natural gas fuel generators to produce electricity to power the electric fracturing equipment, including the electric motors that power the fracturing pumps. These generators require fuel conditioning equipment, such as equipment is used to separate liquids, trap particles, regulate fuel pressure, meter fuel usage, and to ensure safe fracturing operations.

SUMMARY

In at least one embodiment, a system mounted on a skid for use in fracturing operations is disclosed. The system includes a line heater on the skid to enable heating of fuel to be used with a turbine generator and includes one or more pressure regulators coupled to the line heater to enable adjustment of a pressure associated with the fuel.

In at least one further embodiment, a method for supporting fracturing operations is also disclosed. The method includes positioning a line heater on a skid to enable heating of fuel to be used with a turbine generator. A step in the method includes coupling one or more pressure regulators to the line heater. Further, the method includes enabling the one or more pressure regulators to adjust a pressure associated with the fuel.

BRIEF DESCRIPTION OF THE DRAWINGS

The present disclosure will be readily understood upon reading the detailed description of non-limiting embodiments of the present disclosure with the accompanying drawing, in which.

DETAILED DESCRIPTION

Figure 1:
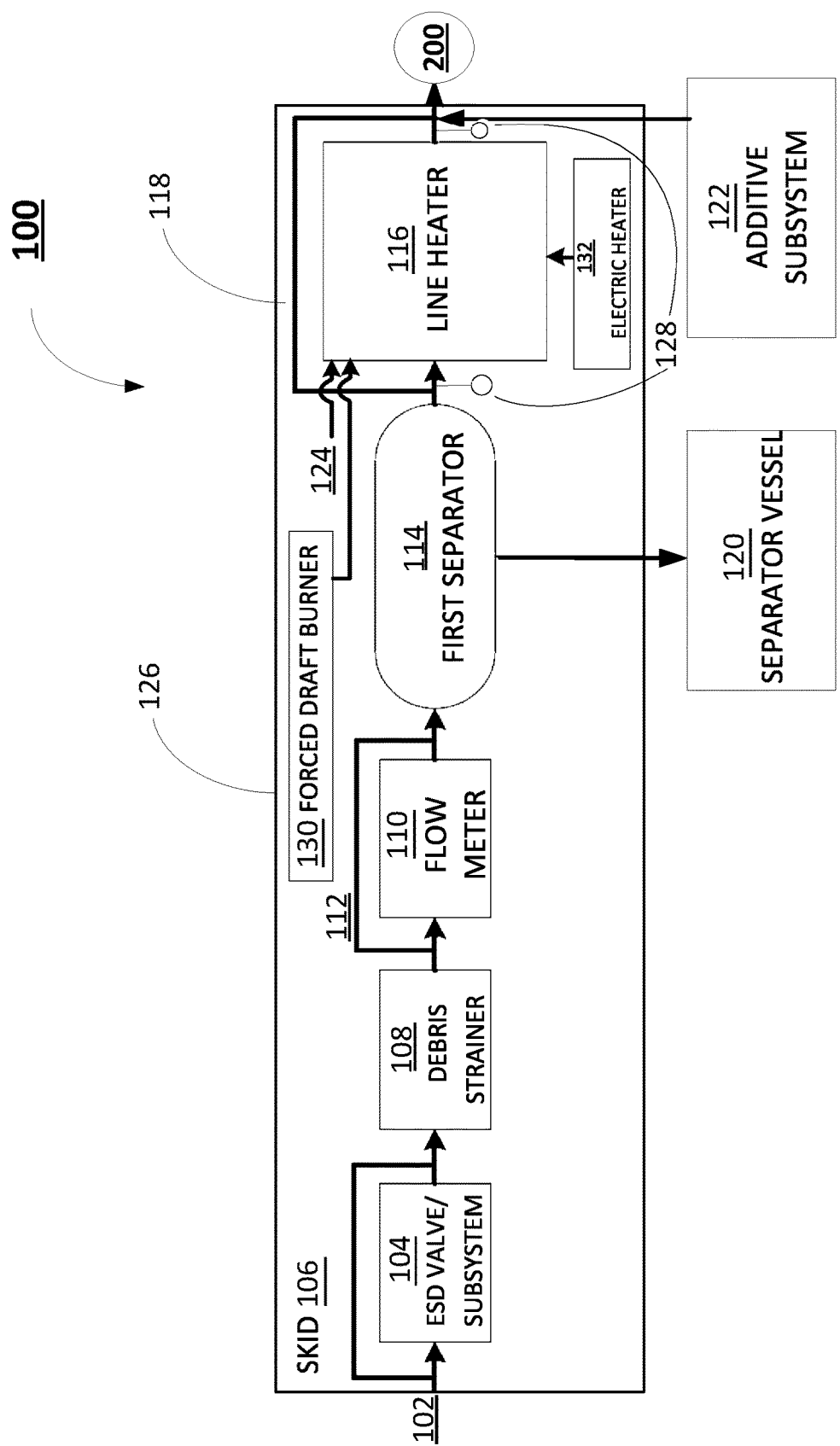
FIG. 1 is a block diagram of at least one part of a system mounted on a skid for use in fracturing operations, according to at least one embodiment of the present disclosure.

The foregoing aspects, features, and advantages of the present technology will be further appreciated when considered with reference to the following description of preferred embodiments and accompanying drawing, wherein like reference numerals represent like elements. In describing the preferred embodiments of the technology illustrated in the appended drawing, specific terminology will be used for the sake of clarity. However, the technology is not intended to be limited to the specific terms used, and it is to be understood that each specific term includes equivalents that operate in a similar manner to accomplish a similar purpose.

When a fracturing operation is scheduled, information is gathered about the location and the requirements for the fracturing operation at the location. Then various equipment must be brought together and moved to the location to be set up. The set up procedure may be long and arduous and may involve testing various features associated with the fracturing operation, as well as arranging various components across various skids, connecting the various components, electrically, communicatively, and fluidly, and certifying one or more of the connections.

One of the testing requirements may involve a determination of the quality of fuel gas, also referred to as fuel, that is to be used in a turbine generator of the fracturing operation. Further, the quality of the fuel may be affected by the environment (for instance, ambient temperature and pressure of the environment) as fracturing operations may largely rely on the same components, but with a wide range of configurations based in part on the extremes in the environment at the location where the fracturing operation is to be performed. In at least one embodiment, if the ambient temperature is below freezing, the fuel from a supply line will need to be conditioned, such as heated, to be able to make it efficient and productive in the turbine.

The determination of the quality of the fuel may include determination of presence of any undesired material in the fuel, determination of a temperature of the fuel, and a determination of a pressure associated with a flow of the fuel. With this information, the various components of for fracturing may be rearranged or engaged with hoses and pipes to address the quality of the fuel with respect to at least requirements of the turbine generator to function in an efficient manner. A manner of addressing the quality of the fuel is to perform a conditioning to adjust the impurities, to adjust its temperature, or to adjust its flowing pressure. Each of these features may also be relative; for instance, the temperature is adjusted relative to a working temperature or an environment temperature; and the pressure is adjusted relative to a working pressure or the environment pressure.

While conditioning fuel gas, equipment that is mounted on different skids or trailers may be engaged together or connected together using flexible gas hoses. The hoses may be expensive and time consuming to connect together or to connect between the equipment on a wellsite. Still further, the connections and the hoses require pressure testing and recertification every six months to meet industry standards. Individual components may need to be brought to the wellsite, may be required to be arranged, adjusted, and connected together, while residing on different skids; and may also require special handling, such as by use of a crane or forklift to set into place. An element of dangerous and a requirement for caution make the process time consuming. The size of the equipment requiring the different skids may limit available options.

In an example, individual components are brought to well sites on individual trailers and hard pipes or flexible hoses to be rigged up in between. These pipes and hoses are interconnecting pieces that may often be common points of failure. As such, additional testing and certifications are required before each use and at times during the usage of such a system. Line heaters in such systems were designed for maximum space usage and final scalable load. As a result, unreliable operations with regulator failures or frozen valves were some of the challenged faced of the system having multiple skids and connectors.

In at least one embodiment, the above referenced shortcomings may be addressed by enabling mobile fuel gas conditioning equipment (referred to also as mobile conditioning equipment or system, mobile fuel conditioning equipment or system, or mobile gas conditioning equipment or system) to be mounted on a skid, a trailer-bed (referred to also as a trailer), or in/on other mobile environments. In at least one embodiment, the conditioning equipment may be mobile and versatile as a result, but also, the fluid and other connections between various components may be long-term connections (such as, not requiring disconnection and reconnection, or other resetting at each wellsite). In at least one embodiment, the versatility is supported by multiple configurations now available to the mobile conditioning equipment that account for size and weight restrictions of a single skid or trailer and that accounts for redundancy, which then improves reliability and ability to operate the mobile conditioning equipment, when mobile, in all types of weather conditions. In at least an aspect, the mobile conditioning equipment mounted on a single skid are coupled together prior to use and during the use, but are also not decoupled except for cleaning operations. As a result, failures and certification requirements are minimized, as well as set up times are greatly reduced.

In at least one embodiment, larger diameter pipes can be used for lower pressure while smaller pipes can be used for high pressure to enable similar volume of fuel for conditioning, irrespective of the inlet pressure at the location. The line heater may be, therefore, designed with smaller 3" (inch) diameter plumbing, thereby allowing for a smaller system that can fit onto a single trailer or skid with other components, such as the pressure regulators, valves, separators, flowmeters, instrumentation, safety equipment, plumbing, and walkways. A bypass tube at a larger diameter, such as 6" size can be built-in to bypass the line heater, when it is not needed. These features enable a smaller equipment package for the system for mobile gas conditioning, while still allowing the conditioning skid to operate with low and high pressure supply gas. This is irrespective of flow restriction or size as the line heater, plumbing, regulators, and other equipment are sized to fit on a single trailer or skid.

FIG. 1 is a block diagram of at least one part 100 of a system mounted on a skid, a portion of which is referenced by numeral 126, for use in fracturing operations, according to at least one embodiment of the present disclosure. The part 100 of the system may include an emergency shut down (ESD) valve or subsystem 104, debris strainer 108, a flowmeter 110, a first separator 114, and a line heater 116. A drain to a separator vessel 120 is provided from the first separator 114 to support environmental control regulations as well as to enable emergency storage options for fuel gas, as described in at least one embodiment elsewhere in this disclosure. A methanol or other chemical additive subsystem 122 may be provided to offer redundant fuel conditioning in the event of a failure of a feature of the line heater 116. The at least one part 100 is of a system that is mounted on a skid for use in fracturing operations.

In at least one embodiment, the line heater 116 is an indirect fired gas heater, such as a glycol bath, that is mounted on a skid. The indirect fired gas heater may use natural gas from a supply line 124 that is either in the environment or from a separate fuel skid to fuel a burner of the indirect fired gas heater. The burner heats a fluid bath of the line heater. The fluid bath may have glycol or other chemical having different temperature properties at one or more phases (such as liquid and vapor phases). In at least one embodiment, the fuel gas may be piped through the fluid bath from a supply line 102 that is either in the environment or from a separate fuel skid. The fuel gas from supply line 102 may pass through or bypass intermediate components of the conditioning skid before being piped through the fluid bath in a fuel pipe inside the fluid bath. The fluid bath being heated provides requisite temperature conditioning of the fuel gas for use with a turbine generator for generating electricity for a fracturing pump.

In at least one embodiment, the burner heats a container having glycol or the other chemical having the different temperature properties and a pump of the indirect fired gas heater is used to pump the glycol or the chemical around conditioning pipes wound around the fuel pipe having the fuel gas for the turbine generator. In this manner, a further element of safety and control many be achieved during mobile conditioning of the fuel gas as to the temperature requirements prior to being consumed by the turbine generator.

In at least one embodiment, the use of natural gas to heat the glycol or the other chemical removes requirement for electric heaters that may be used for mobile conditioning the fuel gas. As the area of operation is high flammable, use of the electric heaters may be dangerous as no flame should be encouraged near any natural gas carrying pipes. The line heater of the present disclosure is relatively safer to the electric heaters. Moreover, the present disclosure is also able to address an issue of the electrical power requirement that would have been required to achieve heating in a comparable electric heater on a skid. In at least one embodiment, the present disclosure is able to operate without a requirement for 100 kilowatts of power that would have otherwise been required to provide the heating that is provided by the line heater. Such power requirements would require a larger transformer, large power cable, and a shore power supply (such as a larger black start generator). In addition, such power would be required for the heater before the turbine is operating as the fuel gas requires proper heating and conditioning before the turbine can be started.

In at least one aspect, in the case of electric heaters to replace or provide redundancy support to the line heater, the heating elements of the electric heater (132 in FIG. 1) is adapted to operate at 120V single phase, 240V split phase, 480V, 600V, 720V, or 4160V 3-phase power. Furthermore, in at least one aspect, to address the safety issues from the use of the electric heaters, heat tracing in the form of an insulated wrapping can be applied to every exposed pipe, vessel, valve, flange, and regulator to allow enough heating to eliminate the need for a dedicated line heater, in at least one embodiment. This heat tracing can operate with either 120 VAC, 240 VAC, 480V, 600V, 720V, or 4160V 3-phase power.

In at least one further embodiment, one of the additional components of the mobile conditioning system include the ESD valve 104, which may be bypassed via a first bypass line 106. In at least one embodiment, the ESD valve 104 valve is a safety valve, such as a large, fast acting valve that can close when an undesired condition is detected. In at least one embodiment, the undesired conditioning may be high gas pressure or may be equipment fire. The ESD valve 104 is design to cut-off the full supply quickly. In at least one embodiment, the cut-off occurs in about one second or less. In at least one aspect, the ESD valve 104 may be an electric or a pneumatic valve. For pneumatic operation, in at least one aspect, gas pressure, compressed air, or compressed nitrogen may be used. In at least one aspect, fuel gas supplied through the fuel pipe or line 102 is sufficient to operate the ESD valve 104. Further, in configurations where the part 100 of the mobile fuel gas conditioning system is not designed to handle fuel below 80 per square inch (psi), the ESD valve 104 may be operable with pressure as low as 50 psi.

In at least one embodiment, a flowmeter 108 can also be installed in part 100 of the system for mobile fuel gas conditioning. In at least one aspect, other flowmeters may be used elsewhere in the system, including before the outlet of the fuel gas, as conditioned, prior to being fed to the turbine generator. The flowmeter 108 is a first flowmeter before the first separator 110, and may be a Coriolis flowmeter that can accurately meter liquids and gases in the fuel gas prior to the line heater 116 and other conditioning components. The other flowmeters that may be used following the temperature and pressure conditioning components 116, 202, 204 (in FIG. 2) may be adapted as an orifice flowmeter. The flow meter at this point is an output flowmeter (which may be a orifice flowmeter). The output flowmeter benefits from the orifice flowmeter adaptation as there may be no liquids at the output of the fuel gas. In at least one embodiment, the flowmeter 108 may be bypassed by a second bypass line 112.

In at least one embodiment, one or more separators 114 may be used in conjunction with one or more separator vessels 120. For instance, a separator vessel 120 with separator 114 follows a debris strainer 108, after the fuel passes a flowmeter 110 or is bypassed around the flowmeter 110. The separator 114 and its separator vessel 120 may be used to separate undesired fluids from the fuel gas. In at least one aspect, any of the separator vessels may be also used to store adequate fuel gas volume from the fuel pipe or line 102.

In at least one embodiment, an emergency operation may rely on the stored fuel gas, in the event of the fuel supply being shut down for any reason. In at least one embodiment, in an emergency operation, a turbine of the turbine generator may idle for over 10 minutes from the stored fuel gas volume in one or more of separator vessels 120. In at least one embodiment, interconnecting pipes and hoses may share the stored fuel gas volume across the one or more separator vessels. In at least one embodiment, one or more debris strainers, such as debris strainer 108, may be provided to strain any debris from the fuel pipe or line 102 prior to passing the fuel through the one or more separators, such as separator 114.

In at least one embodiment, temperature probes can be placed in multiple locations in part 100 of a system for mobile fuel conditioning. The temperature probes are sensors that allow operators to understand the fuel conditions (e.g., relative temperatures) in the multiple stages of the mobile conditioning process as it flows from the fuel pipe or line 102 to the output of the line heater 116. In at least one embodiment, the line heater 116 may be a bypassable heater via third bypass line 118. In a situation where at least the fuel is sufficiently within temperature requirements of the turbine, there may be no need to further condition the fuel. In a situation where the fuel requires a determined level of temperature conditioning, this may be achieved by a mixing of fuel from a conditioned side output of the line heater 116 and from an unconditioned portion that is bypassed by the third bypass line 118.

In at least one embodiment, the part 100 of the mobile fuel gas conditioning system includes a redundant heating sub-system, a feature of which is the methanol or other chemical additive subsystem 122. The redundant heating sub-system includes a separator, such as separator 206 (FIG. 2) and may include a respective vessel 210 forming a methanol extractor to remove the methanol added via subsystem 122 prior to passing the conditioned fuel for the turbine. In at least one embodiment, these features of subsystem 122, separator 206, and the optional vessel 210 may form the redundant heating sub-system to support the heating of the fuel upon failure of a feature of the line heater. A feature of the line heater includes a boiler, a burner, a forced draft burner, or a sensor that may fail and may shut down the line heater. As such, in at least one embodiment, a forced draft burner may use a fan to circulate heated air (as heated by a burner, for instance) around the fuel pipe is associated with the line heater to promote the heating of the fuel.

In at least one embodiment, the present disclosure enables the fuel lines following the line heater or the bypass line 118 to include ports to support the methanol or other chemical additive subsystem 122. The ports enable methanol injection into the fuel as a redundant anti-freeze measure for the fuel and, in general, liquids with in the gas stream comprising the fuel. The second separator 206 (in FIG. 2) may be used to recapture or extract the methanol after the pressure regulator or a determined location in parts 100, 200 of the system, to prevent the methanol from being supplied to the turbine and from causing damage.

In at least one embodiment, the separators 114, 206 in the fuel line, before and after the pressure reduction regulators, enable removal of liquid impurities from the fuel. Here impurities may refer to any undesired component of the fuel than meant for the turbine generator. In at least one aspect, the upstream separator 114 may be adapted to remove any water slugs and free liquids, while the downstream separator 206 may be adapted to remove liquid drop out from the conditioning process or any carry over additives or chemicals previously left from the first separator.

In at least one embodiment, the separators or the separator vessels may be associated with automatic dump valves with low level and high level switches to automatically drain liquids in the separator vessels. These switches may be electric or pneumatic with manual hand operated redundant valves. In at least one embodiment, manifolds may be provided to allow for the fuel gas inlet (at line 102), the fuel gas outlet (214 of FIG. 2), and liquid drain connectors for each separator, on either side of the mobile system for fuel conditioning.

In at least one embodiment, to enable efficient drainage, drain lines may be sized for both 1" and 2" diameter pipes or outlets for adequate liquid draining. Further, the electrically operated automatic dump valves may be controlled by level switches. Manually operated hand valves may be also installed as backups in the event of a switch, PLC, or the automatic dump valve failure. The drain lines may be also adapted with small regulators to ensure that the pressure that is being "dumped" to a holding tank or respective separator vessel does not exceed the tank (or drain line's) rated pressure. One or more check valves may be installed to prevent pressure or liquids from flowing back into the separator vessels from the drain lines.

In at least one aspect, the separator vessels 114, 206 may be adapted with pressure rated liquid sight glasses, magnetic fluid floats, and magnetic level switches for sensing fluid level and for informing the operator. In addition, class ANSI 900# piping can be used on lines or piping prior to the pressure reduction regulators. This allows the conditioning skid to accept supply pressures exceeding about 1480 psi. To save weight, space, and costs, the ANSI class can be reduced to about 300# after pressure reduction. Any compression used may not be capable of exceeding 300# rating without additional regulation.

Figure 2:
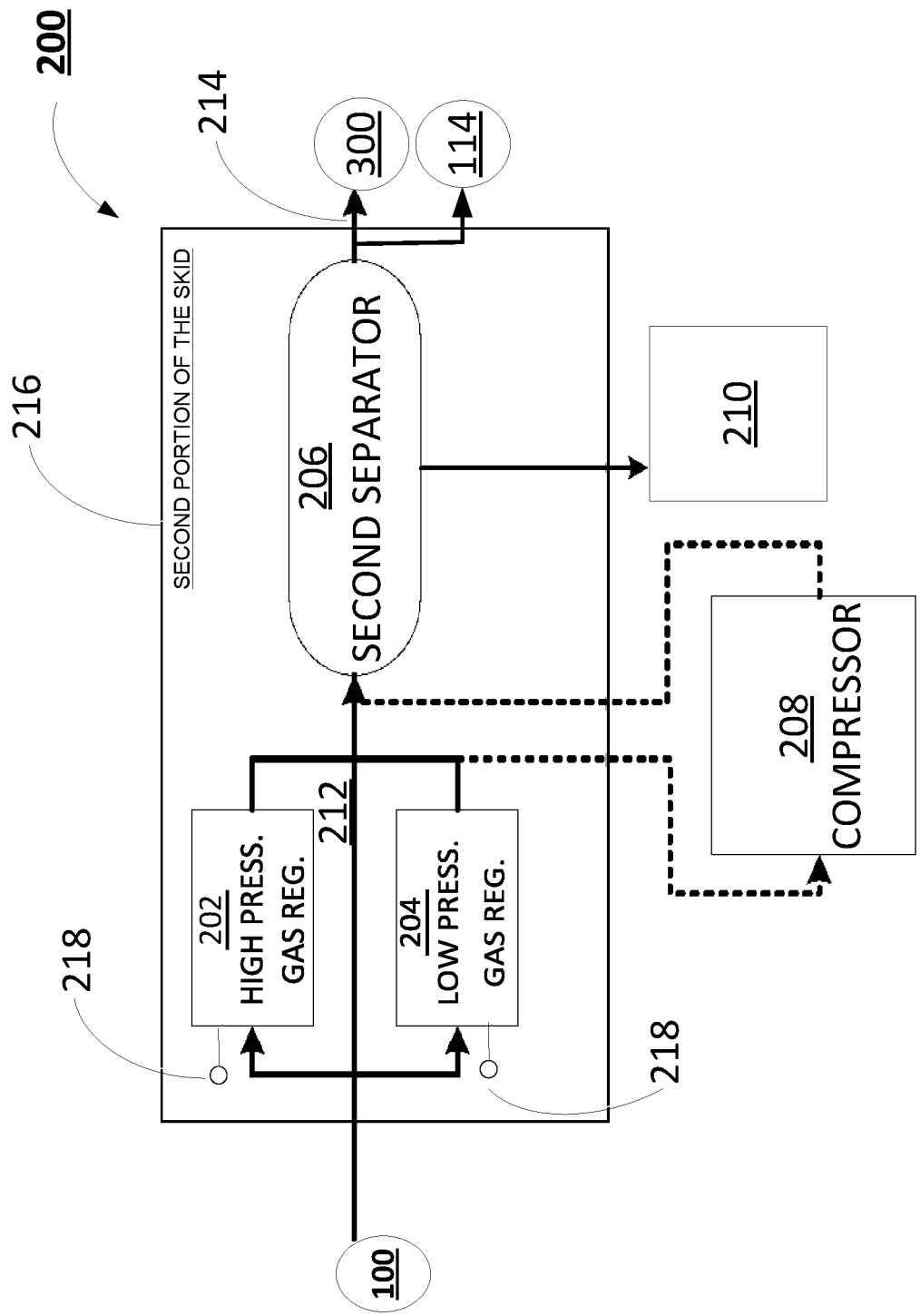
FIG. 2 is another block diagram of at least another part of the system, mounted on the skid referenced in FIG. 1, for use in fracturing operations, according to at least one embodiment of the present disclosure.

FIG. 2 is another block diagram of at least another part 200 of a system, mounted on a second portion 216 of the skid referenced in FIG. 1, for use in fracturing operations, according to at least one embodiment of the present disclosure. The fuel gas exiting the part 100 of the system mounted on a skid may pass to the part 200 of the system mounted on the same skid as part 100. In at least one embodiment, while part 100 culminates in temperature conditioning of the fuel gas, part 200 includes one or more pressure adapters or regulators to achieve pressure regulation of the fuel gas. In at least one embodiment, the pressure adapters or regulators are downstream of the part 100 and are, therefore, downstream of the line heater 116.

In at least one embodiment, when the skid is operating in a high pressure condition (such as a high pressure fuel supply), a high pressure gas regulator 202 regulates fuel gas to an intended pressure for the turbine. In at least one embodiment, one or more high pressure regulators 202 may be solely used to cut the gas pressure to requirements of the turbine requires. In at least one embodiment, the use of the high pressure regulator 202 is in conjunction with the use of the line heater as well to condition the temperature of the fuel. In at least one embodiment, when the skid is operating with a low pressure fuel supply, one or more low pressure regulators 204 will be used to regulate the gas pressure, and a compressor 208 may be used in conjunction to boost the gas pressure to the requirements of the turbine. In at least one embodiment, the one or more low pressure regulators 204 also ensures a consistent pressure for the compressor's 208 inlet. The skid of the present disclosure is able to handle pressures such as 200 psi, which is too low for the turbine, but may be too high for many compressor inlets. In at least an embodiment of such a situation having 200 psi, the gas pressure may be cut to 100 psi for the compressor, and the compressor boosts the gas pressure to 450 psi for the turbine. The present disclosure enables a skid to have fuel gas conditioning equipment that can handle gas pressure from 80 psi to 1480 psi, and that can condition the fuel gas to 450 psi at a temperature where liquids within the fuel gas does not drop out. In at least one embodiment, in addition, when the inlet gas pressure from the supply is too low, the compressor 208 may used to provide any required boost to the pressure.

In at least one embodiment, incoming fuel gas in fuel pipe 102 may be of a certain predetermined gas flow rate that is a low pressure gas flow rate of about 100 psi. In this case, the gas flow pipe having the low pressure gas regulator 204 is adapted to have flanges as large as 6" diameter. In at least one embodiment, when incoming fuel gas in the fuel pipe 102 is of a certain predetermined gas flow rate that is a high pressure gas flow rate of about 1000 psi (and above), the gas flow pipe having the high pressure gas regulator 202 is adapted to have flanges of about 3" or 2" diameter. This enables the gas flow pipes to carry about the same volume irrespective of the pressure at the source. In at least one embodiment, for low pressure gas flow from a source, a 6" pipe is able to achieve a feed 20,000 lbs/hr at 100 psi to the pressure regulators, while for a high pressure gas flow from a source, a 3" pipe is used to achieve the same 20,000 lbs/hr of fuel feed to the pressure regulators at 1000 psi. A nominal pressure for the turbine is about 450 psi, and so the pressure adapters or regulators function to adjust the pressure as required from the low or the higher pressure to the nominal pressure.

In at least one embodiment, the line heater 116 and the pressure regulators 202, 204 work relative to each other. In at least one embodiment, the line heater 116 may be beneficial when the incoming fuel gas at fuel line 102 is at high pressure and when a reduction to a lower pressure is required. As the temperature of the gas will decrease when the pressure is reduced, liquids are caused to drop out of the gas, which can cause the regulators and other equipment, including much of the conditioning equipment on the skid, to freeze. The line heater ensures that this freezing effect does not occur when a pressure cut is applied. The separator 206 may be used to capture the liquids that dropped out without harm to the equipment. In at least one embodiment, the line heater ensures that it is less likely that liquids will form when the pressure cut occurs. In at least one embodiment, a two-stage high pressure regulator is used, but is represented as a high pressure regulator 202. In at least one aspect, the first higher pressure regulator of the two-stage high pressure regulator performs much of the pressure regulation (such as 75% of the pressure regulation), while the second higher pressure regulator ensures uniform pressure output of the fuel. In at least one embodiment, the present disclosure enables a mobile fuel conditioning system that can condition a 1200 psi incoming fuel gas supply to a pressure of about 450 psi for the turbine engine.

In at least one embodiment, there may be a range of acceptable pressures for the fuel gas to the turbine at about 300 to 600 psi, with 450 psi a nominal pressure for the turbine. In at least one aspect, the range of pressures for the source fuel gas supply may be from 100 to 1000 psi. When the 100 psi pressured fuel gas is supplied, the fuel gas bypasses the line heater, passes to the low pressure regulator that is also coupled to a compressor for raising its pressure to a steady 450 psi for the turbine. When the 1000 psi pressured fuel gas is supplied, the pressure is required to be dropped using the high pressure regulator to 450 psi. A roughly 1 degree temperature drop occurs for roughly 7 psi drop in pressure. The pressure drop therefore is substantial and may cause the temperature of the fuel to drop and to freeze the high pressure regulators. As such, the 1000 psi fuel gas needs to be heated prior to regulating the pressure of the fuel. The various conditioning equipment on the skid enables engagement of any one of the equipment suitable to the requirements of the supply gas relative to the turbine requirements; and particularly, without having to remove hoses, add new hoses, or reset any connections. Instead, valves may be adjusted to direct the fuel to the required equipment on the skid.

In at least one embodiment, pressure transmitters may be placed in multiple locations to allow technicians to safely operate and troubleshoot the equipment. Together with the temperature sensors, the mobile system for fuel conditioning may include one or more sensors associated with the line heater and the one or more pressure regulators. The one or more sensors are adapted to detect temperature or pressure information at one or more of an input and an output of the line heater and the one or more pressure regulators. In at least one embodiment, the one or more sensors are also adapted to transmit, via lines 438 (in FIG. 4) or wirelessly, the temperature or pressure information to a remote receiver of a datavan or turbine control trailer 436 (in FIG. 4).

In at least one embodiment, a fourth bypass line 212 enables the one or more pressure regulators 202, 204 to be bypassable pressure regulators. In this configuration, if the incoming gas flow is at an expected pressure for the turbine generator, the pressure related conditioning may not be required. Alternatively, adjusting the pressure of the gas fuel may also have an effect on its temperature. In at least one aspect, the bypass lines represent bypass plumbing to circumvent unused or damaged components. As such, each pressure regulator, separator, meter, ESD valve, and other components in the mobile gas conditioning system can have a bypass pipe used to route around that component to support a form of redundancy or alternative functions.

In at least one embodiment, regulation of gas from higher pressure (such as, for example, over 1000 pounds per square inch (psi)) to lower pressure (such as, for example, under 500 psi) may cause liquid dropout from the pressure and temperature reduction. The dropout of liquid may result in problems with the generator engine (turbine, reciprocating), gas pressure regulators, pressure safety valves, piping, and/or separator vessels. This phenomenon may be associated with or described as the Joule-Thomson effect, or JT effect. The present disclosure addresses issues arising from the JT effect, such as the placement of the line heater in FIG. 1, presented in a key stage of the mobile conditioning process (e.g., after a separator and before the turbine), or can include injection of chemical additives.

In at least one embodiment, when the source pressure is high and pressure reduction is required, the present disclosure prevents freezing of the regulators by heating the fuel before pressure reduction is applied. For example, if the supply gas temperature is 60 degrees Fahrenheit (F) and the pressure reduction is expected to cause a 60 degrees F. temperature drop, the fuel can be heated from 60 degrees F. to 120 degrees F. After the regulation process, the gas temperature will be at 60 degrees F. again. Heating the gas above its dew point reduces liquid dropout during the regulation process. Furthermore, if any phase change occurs the liquids will be above the freezing point and will simply be trapped in the downstream separator.

In at least one embodiment, the fuel in fuel line 102 is subsequently conditioned to eliminate or reduce the JT effect to prevent component failure or other operational difficulties for the later components. In at least one embodiment, this is enabled by at least the line heater that is adapted for a small equipment footprint, such as the skid, along with the pressure regulators, and the redundancies offered. Such a system does not sacrifice equipment footprint on location, mobilization times, ergonomics, safety, or cost. The mobile fuel gas conditioning of the present system utilizes, in at least one embodiment, the components in the parts 100 and 200 of the system described with reference to FIGS. 1 and 2, including, the emergency shut down (ESD) valve, debris strainer, flowmeter and other instrumentation; multiple separators in different parts of the mobile conditioning process; multiple trains of pressure reducing regulators set to different pressures; multiple manifolds, pressure safety valves (PSVs), process control valves, and drain valves; and external ports in between stages of the mobile conditioning process.

In at least one embodiment, the part 200 of the system may include ports at one or more locations that are adapted to receive an external compressor 208. In at least one embodiment, when the gas fuel is at a low supply pressure of about 100 psi in line 102 till the line heater 116, the line heater can be bypassed, but the other conditioning components, such as low pressure regulator 204, separators 114, 206, pressure safety valves 104, process flow valves 410, 416, 418 (FIG. 4), and instrumentation may be still used regardless of pressure. The ports provided at the one or more locations of the mobile system for fuel conditioning may be added after adequate fuel gas conditioning has been performed. In at least one embodiment, the ports are located where the fuel gas is adapted to leave the skid. In at least one embodiment, the fuel gas is compressed by an external compressor 208, and can then be supplied back to the fuel line, at least at the separator 114 of the skid for additional separation, followed by metering or regulation via the pressure regulators 202, 204. The fuel gas could also be provided straight to the generators of system 300 after compression without reentering the skid for further fuel conditioning.

In at least one aspect, instead of the external compressor 208, a small compressor may be integrated into the fuel gas conditioner skid. The small compressor may replace the line heater for low pressure applications, as the heating requirement may be met by the pressure applied to the fuel, or may not be required for low pressure applications in at least one embodiment of the present disclosure. Furthermore, in at least one aspect, the small compressor may be installed parallel to the line heater, or may be installed before or after the line heater.

In at least one embodiment, the process flow valves 410, 416, 418 may be adjusted or set according to the fuel conditioning skid requirements for engaging the appropriate high or low pressure regulators, based in part on the project demands. The valves can also be used to set up the conditioning skid for low pressure, high pressure, or nominal condition operations prior to the operation, without having to handle hoses and connectors that may be subject to operation failures and may require certification as noted elsewhere in this disclosure.

In at least one embodiment, even though the parts 100 and 200 of the system are illustrated with a defined number of components, such as the two separators, the line heater and the two pressure regulators, more than the illustrated number of components may be used as suitable for a skid and the requirement for a project. In at least one embodiment, electric heat tracing may be provided on the pressure reduction (or high pressure) regulators, on pilot tubing and pilot valves, on the process valves, on condensate drain lines, on the piping downstream of the pressure regulators, and on any flow restrictive piping or devices. Such features can prove advantageous for winterization and for redundancy in the event that the line heater cannot provide enough heating or fails.

In at least one embodiment, the line heater is adapted to distribute or circulate heated glycol through a manifold to other upstream and downstream processes for heating or winterizing requirements. Glycol hoses, in at least one aspect, may be wrapped around piping, such as process valves, regulators, pilot tubing, pilot valves, and drain lines, to prevent condensation from freezing inside and outside of the pipe surface. This adaptable may supplement or replace the electric heat tracing. As such, in at least one aspect, heated glycol lines or hoses may be used instead of the electric heat tracing to provide additional heating to components before or after the line heater, other than being used to winterize the equipment. The glycol lines can be from the glycol bath on the line heater or from a secondary heat source that is either an electric heating element or a natural gas burner.

In at least one embodiment, the parts 100, 200 enable a system that is a trailerized fuel conditioning equipment system. While, a physical layout of the components of the parts 100, 200 may be different in a skid, than illustrated in FIGS. 1, 2, and 4, the fuel gas flow and functions adapted to the fuel gas flow at each stage of the parts 100, 200 follows from FIGS. 1, 2, and 4. As such, in at least one aspect, the physical layout on a physical trailer or skid may be configured differently than illustrated. In at least one aspect, the pressure regulators are parallel high and low pressure regulators. The compressor 208 may not be integrated on the skid, but ports allow for its integration into the process flow.

Figure 4:
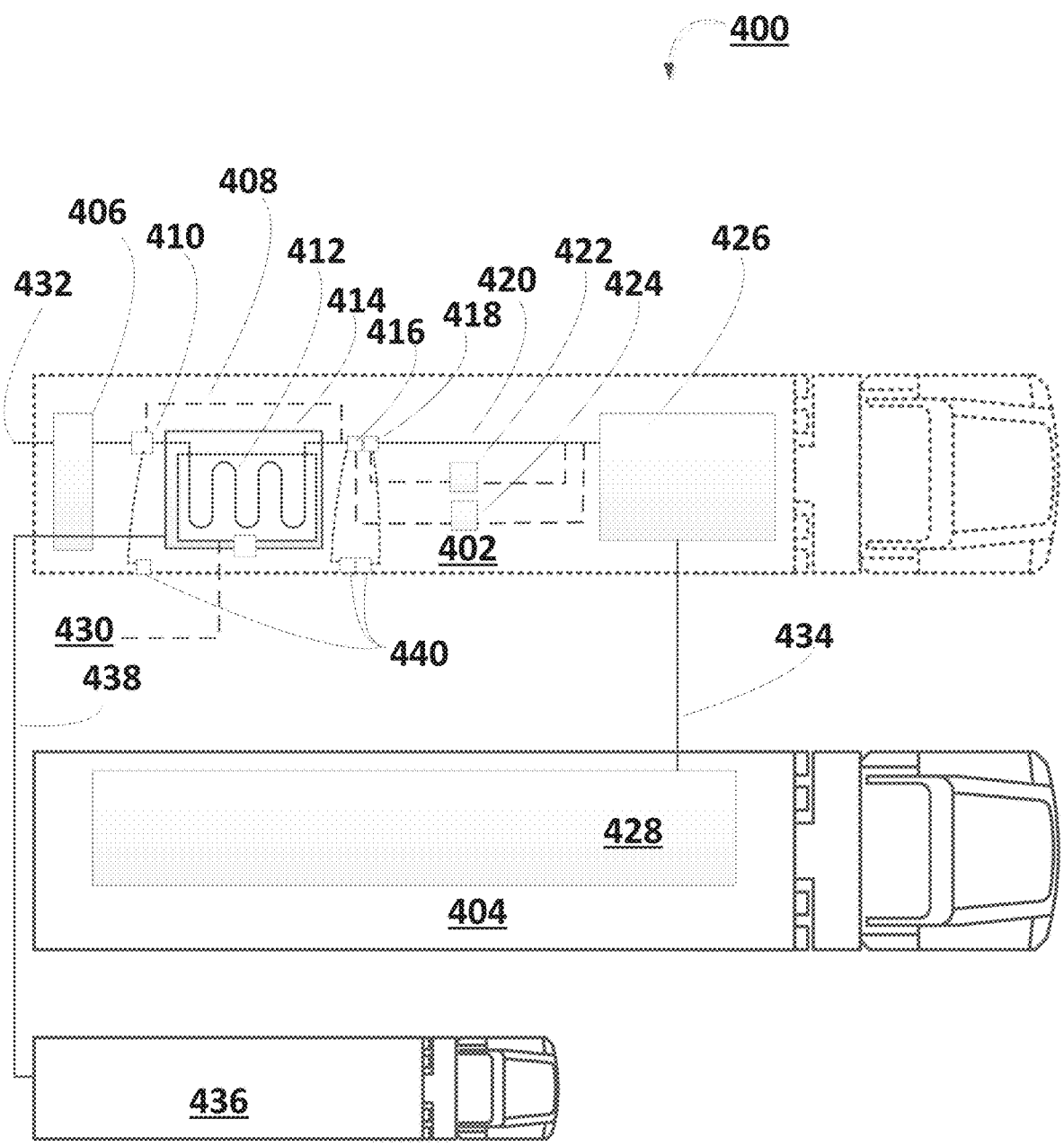
FIG. 4 is a skid diagram of one or more mobility units having mounted thereon mobile fuel conditioning equipment from aspects of the present disclosure.

In at least one aspect, the compressor 208 may be integrated on the skid. Isolating valves (such as illustrated in FIG. 4 and described in the discussion of FIG. 4) may be applied in several places to isolate components such as bypasses, inlets, outlets, drains, and any instrumentation in the parts 100, 200 of the system. Additional bypasses can be installed for the debris strainer 108 and separators 114, 206. In addition, other ports for applications such as compressed natural gas (CNG) and liquefied natural gas (LNG) mixing can be included; as well as pressure safety valves (PSVs or "pop-offs"); for analog and digital temperature and pressure probes; and for small pilot tubes and valves for the pressure regulators.

In at least one aspect, the second separator 206 can also be used for catching spillover from the first separator 114, if the first separator 114 fills too quickly or if its drain system fails. For instance, the bypass line 118 may be engaged to pass the fuel to the second separator 206, and the optional line output to return the fuel to the first separator 114 is engaged from the second separator 206. In at least one embodiment, the first separator 114 may be physically (and functionally) in the conditioning process before the line heater 116, as illustrated, but may also be after the first separator 114. In at least one aspect, an advantage of such an arrangement is that the line heater 116 is only sized to heat the fuel gas and is not required to heat any associated free liquids. This enables a further compact design for sizing on a skid. As such, the system in FIGS. 2 and 3, provide a mobile fuel conditioning system having a line heater on a skid to enable heating of fuel to be used with a turbine generator; and provides one or more pressure regulators coupled to the line heater to enable adjustment of a pressure associated with the fuel.

Figure 3:
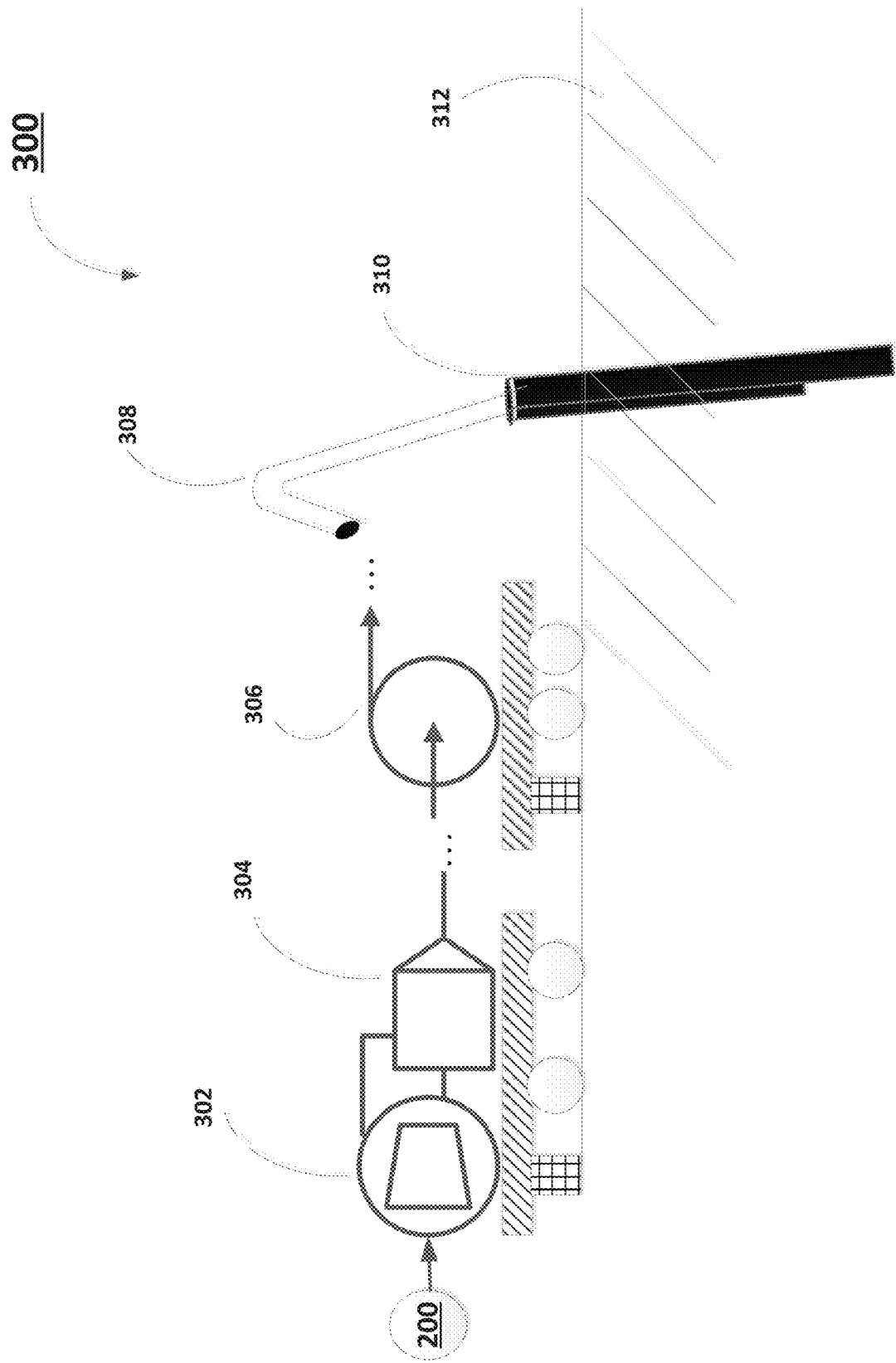
FIG. 3 is a further block diagram of at least a system benefiting from a skid-mounted mobile fuel conditioning equipment, according to at least one embodiment of the present disclosure.

FIG. 3 is a block diagram of at least a system 300 benefiting from a skid-mounted mobile fuel conditioning equipment, according to at least one embodiment of the present disclosure. The system 300 includes a turbine 302 coupled to a generator 304 to generate electricity to suit the requirements of a fracturing pump 306. While FIG. 3 illustrates, at a very high level, features of components and of steps that benefit from the skid-mounted mobile fuel conditioning equipment, there may be other steps or components omitted, but readily understood to a person reading the present disclosure. The steps and components may be between the generator 304 and the fracturing pump 306. Further, in at least one embodiment, the fracturing pump 306 may be physically located on a separate trailer.

In at least one embodiment, the person of ordinary skill reading the present disclosure will recognize that components such as a variable frequency drive (VFD), an electric motor, and a switch gear system may be required in addition to the illustrated components in FIG. 3. Furthermore, a transformer may be provided between the turbine generator 302, 304 and the fracturing pump 306. In at least one embodiment, a flow of the steps or of components for a fracturing system benefiting from the skid-mounted mobile fuel conditioning equipment includes the conditioning equipment, followed by the turbine and generator, followed by switch gear systems, at least one transformer, a variable frequency drive (VFD), a motor, and the pump directing fluid to the wellhead. The pump may be associated with a tubing 308 to pump slurry or other fluids into a bore 310 that passes through a surface of a subterranean or other environment 312 to reach a hydrocarbon environment. Also as illustrated in FIG. 3, the turbine receives conditioned fuel from the part 200 of the mobile system for conditioning fuel in FIG. 2.

FIG. 4 is a skid diagram of one or more mobility units 400 having mounted thereon mobile fuel conditioning equipment from aspects of the present disclosure. In at least one embodiment, the line heater and the associated components in FIGS. 1 and 2 are part of support equipment or system that is intended for conditioning fuel, but that is designed for mobile use by being trailerized, skid-mounted, or bodyload-mounted as desired by an operator. In at least one embodiment, the mobile system for conditioning fuel is entirely on a single skid 402. In at least one aspect, the skid is illustrated with an indirect heating bath 414 functioning as a line heater. The indirect heating bath may be a bath of glycol through which a fuel pipe 412 passes in a zigzagging manner to maximize indirect heating time. In at least one embodiment, the fuel pipe 412 is a high pressure pipe of 3" diameter, while the bypass pipe 408 is a low pressure 6" pipe. This is so that, if the fuel temperature is low, it may be passed through the pipe 412 causing its temperature to increase, while if the fuel is at a low pressure, then it need not pass through the line heater and may by bypassed via bypass pipe 408 that maintains a low pressure as no further temperature conditioning is required.

In at least one embodiment, gas supplied for use in fracturing operations may be in the range of 50-80 degrees Fahrenheit (F). In at least one embodiment, the mobile conditioning for the fuel gas may be a requirement at start-up. There may be no requirement to reduce pressure significantly or to perform additional heating in some aspects. In at least one embodiment, even with low environmental temperatures, once the gas is flowing, the temperature will be above 50 degrees F. In at least one embodiment, when the fuel supply is, however, significantly higher than manageable for the turbine, for instance, 1000+ psi, the line heater becomes beneficial for conditioning the fuel. In most instances of preforming a 500+ psi pressure cut, freezing of the liquids contained in the fuel, and consequently of the conditioning equipment, becomes likely. This may also be the case in summer environmental temperatures due to the gas temperature, after the regulators, being in the negative range.

In at least one embodiment, other conditioning components, including the debris strainer, the separators, the ESD valves, and the flowmeters may be positioned on one side of the trailer, illustrated as housing 406. In at least one embodiment, housing 406 houses a force draft burner to promote the heating of the fuel. In at least one aspect, multiple manual, remote, or automated valves 410, 416, 418 that may function as processes valves are illustrated as adjacent to the line heater 414 and the pressure regulators 422, 424. The valves 410, 416, and 418 are also adjacent to their respective bypass lines 408 (and the lines hosting the pressure regulators 422, 424). The valves on the lines hosting the pressure regulators 422, 424 enable the pressure regulators to be bypassable pressure regulators. The valves may be closers or within a part of the pressure regulators. An external line 430 provides either the natural gas other energy source required to power the line heater 408. In at least one embodiment, fuel for conditioning, distinct from the energy source to power the line heater 408 may be provided via fuel line 432.

In at least one embodiment, equipment following the pressure regulators are provided via housing 426. In at least one aspect, the equipment in housing 426 may include additional separators and may support the redundancy subsystems, including the methanol injector and the extractor (via an additional separator, for instance). The conditioned fuel may be provided via line 434 for the turbine and subsequent components (such as illustrated in FIG. 3), collectively referenced in block 428 that may be hosted on a neighboring skid 404.

In addition, in at least one aspect, on-skid power sources as well as on-shore power connections for external power supplies may be integrated on the skid 402, either inside or outside of one or more housing 406, 426, for use with the system. Solar cells, thermoelectric generators, small reciprocating engine generators, or small turbine generators can be used to provide onboard power for metering, electric valves, electric heat tracing, and onboard lighting. In at least one additional aspect, electrical plugs can be installed to allow for shore power connections such as from a supplemental generator or from a large fracturing turbine.

In at least one aspect, the adjacent locations of the skids 402, 404 enables heat reclamation from the turbine exhaust of skid 404 to provide heating to the mobile gas conditioning equipment, such as a feature of the bath 414, on skid 402. This may be an aspect of cogeneration in regards to turbine engines. Superheated exhaust gases from the turbine may be ducted to the fuel conditioning skid 402, or to a heat exchanger, such as heat exchanger 412 that may be used to provide a heated medium to the mobile fuel conditioning equipment on skid 402.

In at least one embodiment, the present disclosure enables scaling so that the line heater and the regulators, on a single skid, are capable of handling about 30,000 lbs/hr or more of mass flow. Furthermore, in at least one aspect, the line heater is safe or suitable for hazardous areas, such as Class 1 Division 2 areas, and may be adapted for compliance with NFPA 70 codes.

In at least one embodiment, analog gauges may be used along with digital gauges or sensors to improve safety on the skid 402. The use of analog gauges also enables technicians working near the equipment, or working on the equipment, to see the status of the gas temperature and pressure without needing an additional display. This also ensures that operators can determine the status of the skid even if electrical power fails or is otherwise unavailable. In at least one aspect, fold out walkways with hand rails for maintenance and hand valve access may be included on the skid 402. These are supporting structures that may be deployed for onsite operation/maintenance and may be stowed for mobilization.

In at least one aspect, the PSVs may be installed at multiple locations to protect the lowest pressure rated component. In at least one instance, the lowest pressure rated component may be the piping, instrumentation, vessels, valves, fittings, hoses, or flanges. The lowest rated components may differ than the listing depending on the system and application requirements. In at least one embodiment, the line heater and other components that are integrated onto a single skid are also enclosed with a soft shell or hard shell to increase weather related durability, or can remain unenclosed.

In at least one aspect, a forced draft burner may be used with the line heater to increase the efficiency of the line heater from about 65% up to about 85%. The forced draft burner may be located within section 406 with insulated heat pipes to the fuel pipe area in the bath 414. The use of the forced draft burner only to promote efficiency of the line heater results in decreased fuel consumption to achieve the conditioning of the fuel, but can also decrease the physical footprint of the line heater on the fuel conditioning skid. This allows all of the components described for conditioning of fuel gas to fit onto a single 53' trailer or skid that may be about 8.5' wide. In at least one embodiment, a benefit realized by the present disclosure is compaction of the mobile gas conditioning equipment on the trailer or skid that results in a weight of the trailer or skid being under 30,000 lbs, which then removes any requirements for special travel permits.

In at least one embodiment, an electric motor with a softstarter or variable frequency drive can also be used to operate the electric motor for a blower of the forced draft burner (130 in FIG. 1). As such, in at least one embodiment, the reference to line heater can incorporate supplemental or starter heating subsystems, such as the forced draft burner. In at least one aspect, the line heater output may be in the range of about 500 Thousand British Thermal Units per hour (MBTU/Hr) to about 2000 MBTU/Hr. In one example, a 1500 MBTU/Hr indirect fired glycol heater, functioning as a line heater, can accept an inlet gas temperature of about 46.8 degrees F. and heat it to an outlet temperature of about 120 degrees F.

In at least one aspect, the system for mobile fuel conditioning includes the one or more sensors (128 in FIGS. 1 and 218 in FIG. 2, for example) associated with the line heater and the one or more pressure regulators. The one or more sensors are adapted to detect temperature or pressure information at one or more of an input and an output of the line heater and the one or more pressure regulators. The one or more sensors may transmit the temperature or pressure information to a remote receiver of a datavan 436 (in FIG. 4). In at least one aspect, the mobile fuel conditioning system includes one or more first valves associated with an inlet of the line heater to enable bypassing of the line heater, and includes one or more second valves associated with an inlet to the one or more pressure regulators to enable bypassing of the one or more pressure regulators.

In at least one aspect, the mobile fuel conditioning system includes one or more remote receivers 440 (in FIG. 4) that are associated with the one or more first valves or the one or more second valves to enable the bypassing of the line heater or the one or more pressure regulators from an input of a datavan 436 (in FIG. 4) or from one or more sensors (128, 218) associated with the line heater or the one or more pressure regulators. The one or more sensors are adapted to detect temperature information or pressure information during operation of the system.

In at least one aspect, the skid 402 for mobile fuel conditioning is configured for Ethernet and LTE® connections for data collection of process meters, instrumentation, and automated alerts. Serial and Ethernet data connections for automatic and manual (remote) valve controls can be included and can be controlled from a turbine control room or the datavan 436 (in FIG. 4). In at least one embodiment, onboard work lights are provided to enable human operator safety and inspection of aspects of the mobile fuel conditioning system in FIGS. 1, 2, and 4. In addition, as much of the sensors (128, 218) are digital, data may be extracted to a computer on the datavan 436 (in FIG. 4). The data is extracted on a periodic basis from seconds to minutes, or even hour intervals, as required from the wellsite. The data may be correlated or analyzed as discussed elsewhere in this disclosure to be reported or extrapolated to predict further adaptations or configurations of the equipment on a single skid at new well sites.

In at least one embodiment, the present disclosure enables collection and distribution of current temperature, pressure, and quality information associated with the fuel supplied to the turbine during operation. In addition, the present disclosure enables collection and distribution of environmental (such as, ambient) temperature, pressure, and other factors affecting efficient operation of the turbine. With the collected data, the present disclosure enables comparative data analysis and extrapolation to determine appropriate configuration settings of the line heater, the pressure regulators, and any associated components on a skid.

In at least one embodiment, for a new wellsite location, current data of the fuel and ambient conditions available at the wellsite may be input to an intelligent subsystem adapted to perform the data comparisons and extrapolation from the current data and the collected data. The intelligent system correlates and/or extrapolates from the collected data to predict pressure, temperature, and other requirements that would be able to condition the fuel available at the wellsite for optimum operation of a turbine at the wellsite.

In at least one embodiment, a current temperature of the fuel, the pressure of flow, and impurities or constituents within the fuel may be part of the current and the collected data, while an operating temperature, an operating pressure, an operating final constituents may form an operations part of the collected data. Then a relationship between the collected data and the operations part of the collected data is identified to a reasonable error (such as, +/−5%). The relationship is used to extrapolate from the current data to find whether a predicted operations part of the current data is acceptable. When the operations part of the current data is acceptable, temperature, pressure and fuel constituent information is extracted from the collected data corresponding to the extrapolated relationship, and is used as the setting for the equipment on the skid at the wellsite. As more operations are performed, the extrapolations become more accurate and the reasonable error may be reduced or used to weight the extracted data.

In at least one embodiment, the system discussed herein for implementing aspects in accordance with various embodiments are computer-based environments having hardware and software capabilities for intelligent computing. For instance, a computer-based environment may include human-machine interfaces, processors, memory components, and communication components for receiving input from external computers. Further, different computing environments may be used, as appropriate, to implement various embodiments. External computers may be used to interact with various embodiments and can include any appropriate device operable to send and receive requests, messages, or information over an appropriate network and convey information back to a user of the device. Examples of such external computers may include personal computers, smart phones, handheld messaging devices, laptop computers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof using communication component, such as discussed throughout this disclosure.

Figure 5:
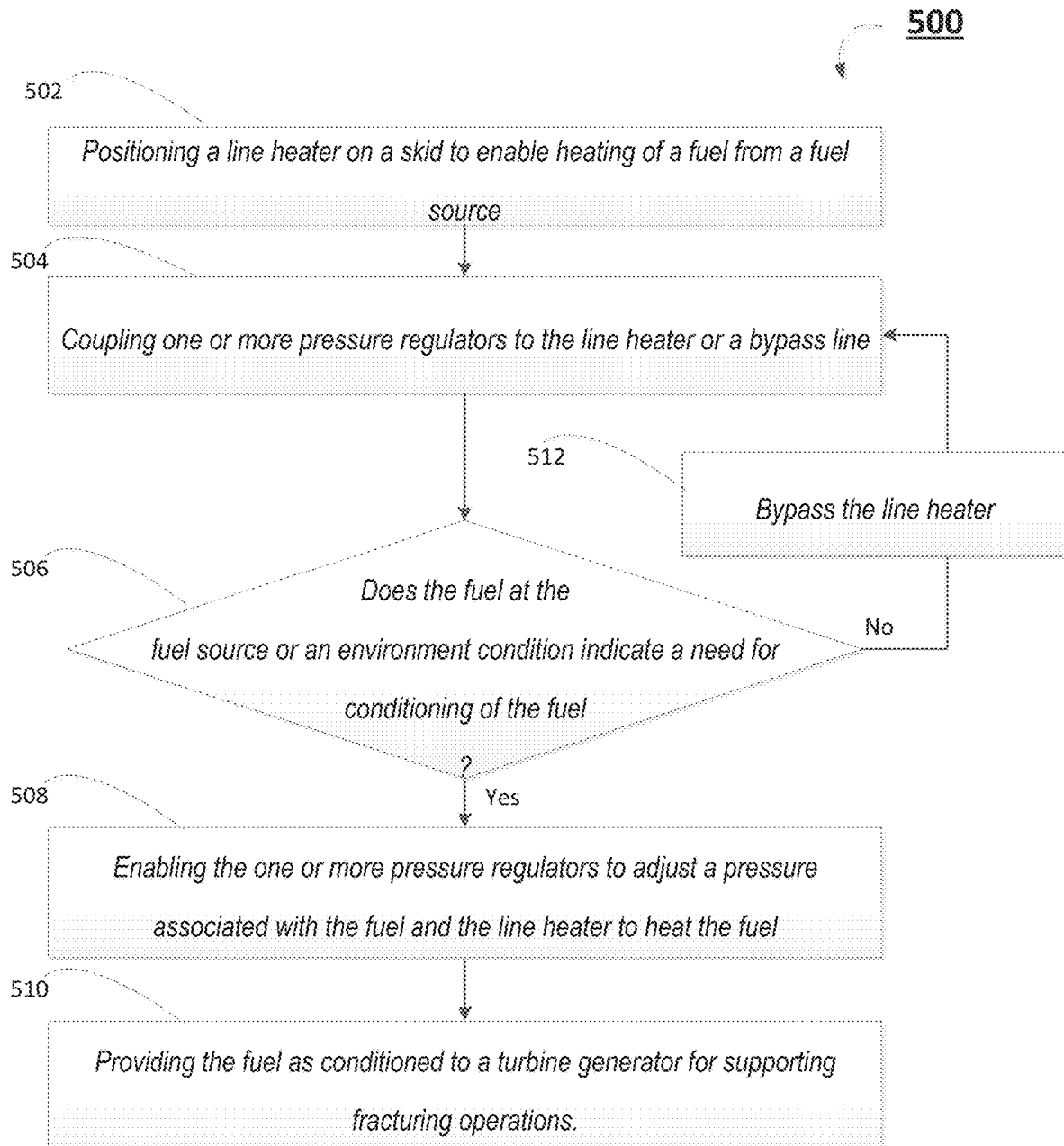
FIG. 5 illustrates a flowchart of a method for skid-mounted mobile fuel conditioning, according to at least one embodiment of the present disclosure.

FIG. 5 illustrates a flowchart of a method 500 for skid-mounted mobile fuel conditioning, according to at least one embodiment of the present disclosure. The method includes a sub-process 502 for positioning a line heater on a skid to enable heating of fuel from a fuel source, with the fuel being conditioned for use with a turbine generator. Sub-process 504 is a coupling of one or more pressure regulators to the line heater. Sub-process 506 is a verification as to whether there is an indication, from collected data, for instance, that the fuel from the fuel source requires conditioning. The collected data may be associated with aspects of the fuel, such as its temperature, a pressure of its flow from the source, and its constituents, and may include aspects of the ambient environment conditions, such as the temperature at the wellsite. When the indication is that conditioning is required, sub-process 508 is invoked. Sub-process 508 enables the one or more pressure regulators to adjust a pressure associated with the fuel and enables the line heater to adjust a temperature of the fuel. In at least one embodiment, the temperature is adjusted prior to the pressure being adjusted to accommodate loss in temperature during pressure reduction of the fuel. In at least one embodiment, the fuel may cycle through the heater or the pressure regulators more than one time. When the indication is that conditioning is not required, the fuel is made to flow through, in sub-process 512, a by-pass line around the line heater, but may engage (or not) the pressure regulator. For instance, a low pressure fuel may be adjusted to the pressure requirements of the turbine. Alternatively, the fuel may bypass 504 the pressure regulators to the turbine. Sub-process 510 provides the conditioned fuel for the turbine to support fracturing operations.

While the technology has been shown or described in only some of its forms, it should be apparent to those skilled in the art that it is not so limited, but is susceptible to various changes without departing from the scope of the technology. Furthermore, it is to be understood that the above disclosed embodiments are merely illustrative of the principles and applications of the present technology. Accordingly, numerous modifications can be made to the illustrative embodiments and other arrangements can be devised without departing from the spirit and scope of the present technology as defined by the appended claims.

What is claimed is:

1. A system mounted on a skid for use in fracturing operations, the system comprising:
   a line heater on the skid for heating fuel to be used with a turbine generator, the line heater with first diameter piping adapted to fit on the skid based at least in part on a predetermined size of the skid; and
   one or more pressure regulators coupled to the line heater and on the skid, the one or more pressure regulators to receive second diameter piping adapted to the fit on the skid and to support to enable adjustment of adjusting a pressure associated with the fuel,
   wherein the first diameter is different than the second diameter.

2. The system of claim 1, further comprising:
   a bypassable indirect heating bath functioning as the line heater through which a fuel pipe comprising the fuel passes to enable the heating of the fuel.

3. The system of claim 1, further comprising:
   a glycol bath or glycol-based heat exchanger provided as the line heater through which a fuel pipe comprising the fuel passes to enable the heating of the fuel.

4. The system of claim 1, further comprising:
   a bypassable high pressure regulator or a bypassable low pressure regulator functioning as the one or more pressure regulators to enable the adjustment of the pressure associated with the fuel.

5. The system of claim 1, further comprising:
   a redundant heating sub-system comprising a methanol injector and a methanol extractor to support the heating of the fuel upon failure of a feature of the line heater.

6. The system of claim 1, further comprising:
   a redundant heating sub-system comprising an electric heater to support the heating of the fuel upon failure of a feature of the line heater.

7. The system of claim 1, further comprising:
   a forced draft burner associated with the line heater to promote the heating of the fuel.

8. The system of claim 1, further comprising:
   one or more sensors associated with the line heater and the one or more pressure regulators, the one or more sensors to:
   detect temperature or pressure information at one or more of an input and an output of the line heater and the one or more pressure regulators; and
   transmit the temperature or pressure information to a remote receiver of a datavan.

9. The system of claim 1, further comprising:
   one or more first valves associated with an inlet of the line heater to enable bypassing of the line heater; or
   one or more second valves associated with an inlet to the one or more pressure regulators to enable bypassing of the one or more pressure regulators.

10. The system of claim 9, further comprising:
    one or more remote receivers associated with the one or more first valves or the one or more second valves to enable the bypassing of the line heater or the one or more pressure regulators from an input of a datavan or from one or more sensors associated with the line heater or the one or more pressure regulators, the one or more sensors to detect temperature information or pressure information during operation of the system.

11. A method for supporting fracturing operations, the method comprising:
    positioning a line heater and one or more pressure regulators on a skid to enable for heating fuel to be used with a turbine generator, the line heater with first diameter piping adapted to fit on the skid based at least in part on a predetermined size of the skid;
    coupling the one or more pressure regulators to the line heater, the one or more pressure regulators to receive second diameter piping adapted to the fit on the skid, wherein the first diameter is different than the second diameter; and
    enabling the one or more pressure regulators to adjust a pressure associated with the fuel.

12. The method of claim 11, further comprising:
    providing a bypassable indirect heating bath to function as the line heater; and
    enabling the fuel to pass through a fuel pipe within the bypassable indirect heating bath comprising a chemical warmer to perform the heating of the fuel.

13. The method of claim 11, further comprising:
    providing a glycol bath or glycol-based heat exchanger as the line heater;
    enabling the fuel to pass through a fuel pipe within the glycol bath or the glycol-based heat exchanger to perform the heating of the fuel.

14. The method of claim 11, further comprising:
    providing a bypassable high pressure regulator or a bypassable low pressure regulator to function as the one or more pressure regulators; and
    enabling the adjustment of the pressure associated with the fuel using the bypassable high pressure regulator or the bypassable low pressure regulator.

15. The method of claim 11, further comprising:
    supporting the heating of the fuel upon failure of a feature of the line heater using redundant heating comprising a methanol injector and a methanol extractor.

16. The method of claim 11, further comprising:
    supporting the heating of the fuel upon failure of a feature of the line heater using redundant heating comprising an electric heater.

17. The method of claim 11, further comprising:
    promoting the heating of the fuel using a forced draft burner associated with the line heater.

18. The method of claim 11, further comprising:
    associating one or more sensors with the line heater and the one or more pressure regulators;
    detecting temperature or pressure information using the one or more sensors at one or more of an input and an output of the line heater and the one or more pressure regulators; and
    transmitting the temperature or pressure information to a remote receiver of a datavan.

19. The method of claim 11, further comprising:
    associating one or more first valves with an inlet of the line heater to enable bypassing of the line heater; or
    associating one or more second valves with an inlet to the one or more pressure regulators to enable bypassing of the one or more pressure regulators.

20. The method of claim 19, further comprising:
    associating one or more remote receivers with the one or more first valves or the one or more second valves;
    enabling, by the association of the one or more remote receivers, the bypassing of the line heater or the one or more pressure regulators by:
    one or more remote inputs from a datavan or from one or one or more second inputs from sensors associated with the line heater or
    the one or more pressure regulators used to detect temperature information or pressure information.

* * * * *